(12) United States Patent
Hamada et al.

(10) Patent No.: US 12,344,753 B2
(45) Date of Patent: Jul. 1, 2025

(54) INK SET AND IMAGE RECORDING METHOD

(71) Applicant: FUJIFILM Corporation, Tokyo (JP)

(72) Inventors: Naoka Hamada, Kanagawa (JP); Atsushi Kaeriyama, Kanagawa (JP); Shota Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 366 days.

(21) Appl. No.: 17/871,372

(22) Filed: Jul. 22, 2022

(65) Prior Publication Data

US 2022/0372320 A1  Nov. 24, 2022

Related U.S. Application Data

(63) Continuation of application No. PCT/JP2021/002678, filed on Jan. 26, 2021.

(30) Foreign Application Priority Data

Feb. 28, 2020 (JP) ................................. 2020/034206
Aug. 28, 2020 (JP) ................................. 2020-145006

(51) Int. Cl.
*C09D 11/40* (2014.01)
*B41J 2/01* (2006.01)
(Continued)

(52) U.S. Cl.
CPC ................. *C09D 11/40* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227;
(Continued)

(56) References Cited

U.S. PATENT DOCUMENTS 5,506,295 A      4/1996  Kado et al.
2009/0202724 A1*  8/2009  Arai ..................... C09D 11/033
                                                  106/31.86
(Continued)

FOREIGN PATENT DOCUMENTS

CN        102993826 A      3/2013
CN        107735464 A      2/2018
(Continued)

OTHER PUBLICATIONS

International Search Report issued Apr. 6, 2021 in International Application No. PCT/JP2021/002678.
(Continued)

*Primary Examiner* — Manish S Shah
(74) *Attorney, Agent, or Firm* — Sughrue Mion, PLLC

(57) ABSTRACT

An ink set including an ink containing water, a pigment, a pigment dispersion polymer A, and a water-soluble polymer B, and a treatment liquid containing water and at least one selected from the group consisting of a polyvalent metal salt, an acidic compound, and a cationic polymer, in which the pigment dispersion polymer A contains a specific acid group and an aromatic ring, and the water-soluble polymer B contains a specific acid group and a constitutional unit represented by General Formula (1), and in the ink, a mass ratio of a content concentration of the water-soluble polymer B to a content concentration of the pigment dispersion polymer A in a liberated polymer is 1.6 or more, and an image recording method. $R^1$ represents a hydrogen atom or a monovalent substituent, $Y^1$ represents a monovalent substituent, $A^1$ represents —O—, and $L^1$ is a divalent linking group.

General Formula (1)

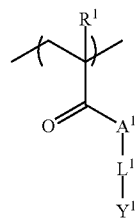

19 Claims, No Drawings

(51) Int. Cl.
| | |
|---|---|
| *B41J 2/21* | (2006.01) |
| *B41M 5/00* | (2006.01) |
| *B41M 7/00* | (2006.01) |
| *C09D 11/033* | (2014.01) |
| *C09D 11/037* | (2014.01) |
| *C09D 11/106* | (2014.01) |
| *C09D 11/107* | (2014.01) |
| *C09D 11/322* | (2014.01) |
| *C09D 11/326* | (2014.01) |
| *C09D 11/38* | (2014.01) |
| *C09D 11/54* | (2014.01) |

(52) U.S. Cl.
CPC ........ *B41M 5/0017* (2013.01); *B41M 5/0023* (2013.01); *B41M 7/0018* (2013.01); *C09D 11/033* (2013.01); *C09D 11/037* (2013.01); *C09D 11/106* (2013.01); *C09D 11/107* (2013.01); *C09D 11/322* (2013.01); *C09D 11/326* (2013.01); *C09D 11/38* (2013.01); *C09D 11/54* (2013.01)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 2012/0127233 A1 | 5/2012 | Yamashita et al. | |
| 2012/0320121 A1* | 12/2012 | Arai | C09D 11/322 524/321 |
| 2012/0320123 A1* | 12/2012 | Takeda | C09D 11/322 524/320 |
| 2013/0070036 A1 | 3/2013 | Ooishi | |
| 2013/0202858 A1 | 8/2013 | Shimohara | |
| 2013/0250002 A1 | 9/2013 | Nishimura et al. | |
| 2015/0191613 A1 | 7/2015 | Tojo et al. | |
| 2016/0222238 A1* | 8/2016 | Arai | B41M 5/0017 |
| 2016/0368285 A1 | 12/2016 | Shinjo et al. | |
| 2017/0362452 A1 | 12/2017 | Yasuda et al. | |
| 2018/0056691 A1* | 3/2018 | Arai | C09D 11/101 |
| 2018/0187034 A1 | 7/2018 | Takeno et al. | |
| 2019/0010349 A1* | 1/2019 | Shimono | B41J 2/2114 |
| 2020/0010708 A1 | 1/2020 | Sugihara et al. | |
| 2020/0399490 A1 | 12/2020 | Kaeriyama | |

FOREIGN PATENT DOCUMENTS

| | | |
|---|---|---|
| EP | 3 279 277 A1 | 2/2018 |
| EP | 3 578 376 A1 | 12/2019 |
| JP | 7-242849 A | 9/1995 |
| JP | 10-120952 A | 5/1998 |
| JP | 2010-030305 A | 2/2010 |
| JP | 2012-122060 A | 6/2012 |
| JP | 2013-072045 A | 4/2013 |
| JP | 2013-159689 A | 8/2013 |
| JP | 2014-205766 A | 10/2014 |
| JP | 2016-194041 A | 11/2016 |
| JP | 2017-007331 A | 1/2017 |
| JP | 2017-101125 A | 6/2017 |
| JP | 2017-141382 A | 8/2017 |
| JP | 2018-122589 A | 8/2018 |
| JP | 6432895 B2 | 12/2018 |
| WO | 2017/212848 A1 | 12/2017 |
| WO | 2019/189817 A1 | 10/2019 |

OTHER PUBLICATIONS

Written Opinion of the International Searching Authority issued Apr. 6, 2021 in International Application No. PCT/JP2021/002678.
International Preliminary Report on Patentability issued Aug. 30, 2022 in International Application No. PCT/JP2021/002678.
Office Action issued Oct. 20, 2023 in Chinese Application No. 202180013734.1.
Office Action issued Nov. 15, 2023 in Chinese Application No. 202180013741.1.
Wu Qiutao, "Flexible Packaging Practical Technical Questions and Answers", Nov. 30, 2008. 1st Edition, p. 147 (3 pages total).
"Screen Printing Technology Handbook", The Screen Printing Technical Manual Editorial Committee, Oct. 31, 1991, Version 1, p. 149 (3 pages total).
Yue Demao, "Practical Handbook of Printing Technology vol. 3: Printing Equipment", Apr. 30, 2010, 1st Edition, p. 142 (3 pages total).
Chinese Office Action dated Jul. 28, 2023 in Application No. 202180013741.1.
Chinese Office Action issued Feb. 6, 2024 in Application No. 202180013741.1.
Office Action issued Jul. 11, 2023 in Japanese Application No. 2022-503177.
Office Action dated Feb. 9, 2023 issued in Chinese Application No. 202180013741.1.
Office Action dated Mar. 8, 2023 from the Chinese Patent Office in Application No. 202180013734.1.
Extended European Search Report issued Jun. 23, 2023 in European Application No. 21761580.6.
Extended European Search Report issued Jun. 26, 2023 in European Application No. 21760126.9.
Office Action issued Jul. 11, 2023 in Japanese Application No. 2022-503178.
Communication dated Mar. 3, 2025 in European Application No. 21760126.9.

* cited by examiner

INK SET AND IMAGE RECORDING METHOD

CROSS-REFERENCE TO RELATED APPLICATIONS

This application is a Continuation of PCT International Application No. PCT/JP2021/002678 filed on Jan. 26, 2021, which claims priority under 35 U.S.C. § 119(a) to Japanese Patent Application No. 2020-034206 filed on Feb. 28, 2020, and Japanese Patent Application No. 2020-145006 filed on Aug. 28, 2020. Each of the above application(s) is hereby expressly incorporated by reference, in its entirety, into the present application.

BACKGROUND OF THE INVENTION

1. Field of the Invention

The present disclosure relates to an ink set and an image recording method.

2. Description of the Related Art

As an image recording method on a recording medium such as paper, methods using an electrophotographic method, a sublimation-type or melt-type thermal transfer method, an ink jet method, and the like has been widely known. Among these, for reasons that no printing plate is required, an ink can be selectively jetted to a desired portion to enable recording, and the like, a recording method using the ink jet method (hereinafter, referred to as an ink jet recording method) has various advantages that running cost is low, a device is relatively inexpensive as compared with a recording device using another method, and it is possible to reduce the size and noise.

As the ink jet recording method, a method for directly applying an ink to a recording medium to record an image, and a method for applying a treatment liquid that acts on components in an ink to a recording medium in advance and applying the ink to record an image have been known.

As the former method, it is disclosed in various documents that, for example, an ink for ink jet, which contains a resin A having a carboxy group and a resin B having a carboxy group and dispersing a pigment (for example, see JP2012-122060A), and an ink composition for ink jet, which contains particles of a polymer compound containing a copolymer that contains a repeating unit derived from a hydrophilic monomer, a water-soluble polymer, a colorant, water, and the like (for example, see JP2013-159689A).

In the related art, a composition containing a water-soluble polymer in an ink has also been proposed.

On the other hand, the latter method has an advantage that it is possible to record a higher-definition image at a higher speed than the former method.

For example, in JP6432895B, an image recording method using an ink set containing an aqueous ink composition containing an aqueous medium, resin fine particles composed of a resin, and a pigment, and a treatment agent for aggregating an ink composition is disclosed.

SUMMARY OF THE INVENTION

In the related art, for example, as in JP6432895B, an aggregated state of the aqueous ink composition containing the resin fine particles is not uniform in a case where the treatment agent acts during the recording, depending on a content of the resin fine particles and the like, so that partially unnecessary shades of color may appear in the image as grainy or streaky defects. The shades of color in the image may be one of causes of deteriorating the quality of an image. For example, in a case where an image is recorded by an ink jet method, a plurality of ink droplets for forming an image tend to interfere with each other. In a case where ink droplets of the plurality of ink droplets that interfere with each other partially move or coalesce, unplanned shades of color appear in the image. As a result, "bleeding" that appears as a feeling of roughness in an image, uneven density, or the like may occur.

The present disclosure has been made in view of the above description.

An object to be solved by an embodiment of the present disclosure is to provide an ink set that suppresses an occurrence of bleeding in an image and allows image cracking to be less likely to occur.

An object to be solved by another embodiment of the present disclosure is to provide an image recording method for suppressing an occurrence of bleeding in an image and recording an image in which cracking is less likely to occur.

The "bleeding" in the present disclosure includes shades of color visually observed as spots or granules, shades of color visually observed as linear or streaky, and the like.

In addition, image cracking (also referred to as cracking of an image) is a phenomenon in which an image (ink film) that has been recorded is cracked, and the color of a recording medium can be seen from the crack to the extent that the color change can be visually recognized.

The specific means for achieving the above-described object includes the following aspects.

<1> An ink set comprising an ink composition that contains water, a pigment, a pigment dispersion polymer A, and a water-soluble polymer B different from the pigment dispersion polymer A, and a treatment liquid that contains water and at least one selected from the group consisting of a polyvalent metal salt, an acidic compound, and a cationic polymer, in which the pigment dispersion polymer A contains at least one acid group selected from the group consisting of a phosphoric acid group, a sulfonic acid group, and a carboxylic acid group, and an aromatic ring, the water-soluble polymer B contains at least one acid group selected from the group consisting of a phosphoric acid group, a sulfonic acid group, and a carboxylic acid group, and a constitutional unit represented by General Formula (1), in the ink composition, a ratio of a content concentration of the water-soluble polymer B to a content concentration of the pigment dispersion polymer A in a liberated polymer is 1.6 or more in terms of a mass,

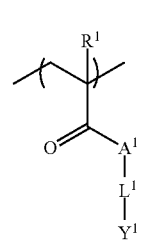

General Formula (1)

in the Formula, $R^1$ represents a hydrogen atom or an alkyl group having 1 to 4 carbon atoms, $A^1$ represents —O—, $L^1$ represents a divalent linking group that is one kind selected from the group A consisting of an alkylene group, an alkenylene group, an alkynylene group, an arylene group, —O—, and —C(=O)—, or a divalent linking group that is obtained by combining two or more kinds selected from the group A, $Y^1$ represents —OH, —$R^2$, —$OR^2$, —$NH_2$, —$NHR^2$, —$NR^2R^3$, or —SH, and $R^2$ and $R^3$ each independently represent an alkyl group having 1 to 3 carbon atoms, an alkenyl group having 2 or 3 carbon atoms, or an alkynyl group having 2 or 3 carbon atoms.

<2> The ink set according to <1>, in which the pigment dispersion polymer A is a polymer having a C log P of 1.75 or more, and the water-soluble polymer B is a polymer having a C log P of 1.74 or less.

<3> The ink set according to <1> or <2>, in which a content of the water-soluble polymer B in the ink composition is 1% by mass to 5% by mass with respect to a total mass of the ink composition.

<4> The ink set according to any one of <1> to <3>, in which a total amount of the acid group and the constitutional unit represented by General Formula (1) in the water-soluble polymer B is 5% by mass to 45% by mass with respect to a solid content mass of the water-soluble polymer B.

<5> The ink set according to any one of <1> to <4>, in which a weight-average molecular weight of the water-soluble polymer B is 5,000 to 100,000.

<6> The ink set according to any one of <1> to <5>, in which an acid value of the water-soluble polymer B is 28 mgKOH/g to 230 mgKOH/g.

<7> The ink set according to any one of <1> to <6>, in which the water-soluble polymer B contains a carboxylic acid group as the acid group, and 40% by mol or more of the carboxylic acid group is neutralized with a base.

<8> The ink set according to <7>, in which the base is a hydroxide of an alkali metal or an organic amine having a boiling point of 80° C. or higher.

<9> The ink set according to any one of <1> to <8>, in which a content ratio of the constitutional unit represented by General Formula (1) in the water-soluble polymer B is 3% by mass to 45% by mass with respect to all constitutional units of the water-soluble polymer B.

<10> The ink set according to any one of <1> to <9>, wherein the water-soluble polymer B further contains at least one constitutional unit selected from the group consisting of the constitutional unit represented by General Formula (A) or General Formula (B),

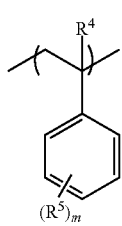
(A)

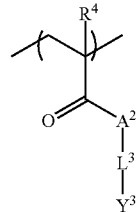
(B)

in the Formulae, $R^4$'s each independently represent a hydrogen atom or a methyl group, $R^5$'s each independently represent an alkyl group, an alkenyl group, or an alkynyl group, m is an integer of 0 to 5, $A^2$ represents a single bond or —O—, $L^3$ represents a divalent linking group that is one kind selected from the group B consisting of an alkylene group, an alkenylene group, an alkynylene group, —O—, and —C(=O)—, a divalent linking group that is obtained by combining two or more kinds selected from the group B, or a single bond, and $Y^3$ represents an alkyl group having 4 to 22 carbon atoms, an alkenyl group having 4 to 22 carbon atoms, an alkynyl group having 4 to 22 carbon atoms, a cycloalkyl group having 4 to 22 carbon atoms, or an aryl group having 6 to 22 carbon atoms.

<11> The ink set according to <10>, in which the water-soluble polymer B contains, as the constitutional unit represented by General Formula (A) or General Formula (B), at least one constitutional unit selected from the group consisting of a constitutional unit represented by General Formula (a) and a constitutional unit represented by any one of General Formulae (b-1), (b-2), (b-3), or (b-4),

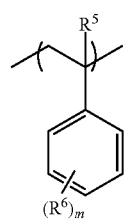
(a)

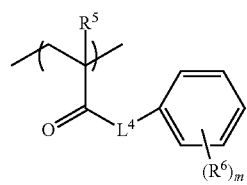
(b-1)

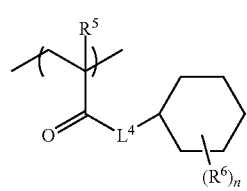
(b-2)

-continued

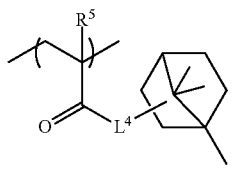
(b-3)

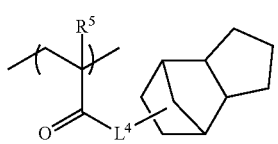
(b-4)

in the Formulae, R⁵'s each independently represent a hydrogen atom or a methyl group, R⁶'s each independently represent an alkyl group, m represents an integer of 0 to 5, and n represents an integer of 0 to 11, and L⁴'s each independently represent a divalent linking group that is one kind selected from the group C consisting of an alkylene group having 1 to 18 carbon atoms, —O—, and —C(=O)—, a divalent linking group that is obtained by combining two or more kinds selected from the group C, or a single bond.

<12> The ink set according to <11>, wherein a total content ratio of the constitutional unit represented by General Formula (a) and the constitutional unit represented by any one of General Formulae (b-1), (b-2), (b-3), or (b-4) in the water-soluble polymer B is 5% by mass to 50% by mass with respect to all constitutional units of the water-soluble polymer B.

<13> The ink set according to any one of <1> to <12>, in which the water-soluble polymer B has a glass transition temperature (Tg) of 80° C. or higher.

<14> The ink set according to any one of <1> to <13>, in which the ink composition further contains a water-soluble organic solvent, the water-soluble organic solvent contains a first organic solvent having a boiling point of 110° C. to 240° C., and a second organic solvent having a boiling point of 245° C. to 300° C., and a mass ratio of a content of the second organic solvent to a content of the first organic solvent is 0 to 0.3.

<15> The ink set according to <14>, in which a total amount of the first organic solvent and the second organic solvent is 5% by mass to 30% by mass with respect to a total mass of the ink composition.

<16> The ink set according to <14> or <15>, in which each of the first organic solvent and the second organic solvent is at least one alcohol-based organic solvent selected from the group consisting of ethylene glycol, diethylene glycol, propylene glycol, triethylene glycol, dipropylene glycol, glycerin, and an alkyl ether thereof.

<17> The ink set according to any one of <1> to <16>, in which the acidic compound contains a monovalent, divalent, or trivalent acid.

<18> The ink set according to any one of <1> to <17>, in which the ink set is used in an ink jet recording method.

<19> an image recording method comprising a step of applying a treatment agent of the ink set according to any one of <1> to <18> onto a recording medium, and a step of applying the ink composition of the ink set according to any one of <1> to <18> onto a treatment liquid-applied surface of the recording medium to which the treatment agent has been applied to recording an image.

According to the embodiment of the present disclosure, the ink set that suppresses an occurrence of bleeding in an image and allows image cracking to be less likely to occur is provided.

According to the other embodiment of the present disclosure, the image recording method for suppressing an occurrence of bleeding in an image and recording an image in which cracking is less likely to occur is provided.

DESCRIPTION OF THE PREFERRED EMBODIMENTS

Hereinafter, the contents of the present disclosure will be described in detail.

The configuration requirements will be described below based on the representative embodiments of the present disclosure, but the present disclosure is not limited to such embodiments.

In the present disclosure, a term "to" showing a range of numerical values is used as a meaning including a lower limit value and an upper limit value disclosed before and after the term.

In a range of numerical values described in stages in the present disclosure, the upper limit value or the lower limit value described in one range of numerical values may be replaced with an upper limit value or a lower limit value of the range of numerical values described in other stages. In addition, in a range of numerical values described in the present disclosure, the upper limit value or the lower limit value of the range of numerical values may be replaced with values shown in the examples.

In the present specification, in a case where a plurality of substances corresponding to individual components are present in a composition, unless otherwise specified, the amount of each component in the composition means the total amount of the plurality of components present in the composition.

The term "solid content" in the present specification means a component excluding a solvent, and a liquid component such as a low molecular weight component other than a solvent is also included in the "solid content" in the present specification.

The term "solvent" in the present specification is used to include water, an organic solvent, and a mixed solvent of water and an organic solvent.

In the present specification, either or both of acrylic and methacrylic may be referred to as "(meth)acrylic". For example, "(meth)acrylic acid" includes both acrylic acid and methacrylic acid.

In the present specification, the term "step" includes not only an independent step but also a step provided that the intended purpose of the step is achieved even in a case where the step cannot be clearly distinguished from other steps.

Compounds not specified as substituted or unsubstituted in the present disclosure may have any substituent as long as the effects in the present disclosure are not impaired.

In the present disclosure, a combination of two or more preferable aspects is the more preferable aspect.

The weight-average molecular weight (Mw) in the present disclosure is measured by gel permeation chromatography (GPC).

HLC-8220GPC (manufactured by TOSOH CORPORATION) is used as the GPC, three columns, TSKgeL Super HZ2000, TSKgeL Super HZ4000, and TSKgeL Super HZ-H (all manufactured by TOSOH CORPORATION, 4.6 mm×15 cm) are connected in series, and NMP (N-methylpyrrolidone) is used as an eluent. The sample concentration is 0.3% by mass, the flow rate is 0.35 ml/min, the sample injection amount is 10 μL, the measurement temperature is 40° C., and the refractive index (RI) detector (differential refractive index detector) is used as a detector. The calibration curve is prepared using 6 samples of "F-80", "F-20", "F-4", "F-2", "A-5000", and "A-1000", which are "Standard Samples TSK standard, polystyrene" manufactured by TOSOH CORPORATION.

<Ink Set>

An ink set of the present disclosure includes an ink composition that contains water, a pigment, a pigment dispersion polymer A, and a water-soluble polymer B different from the pigment dispersion polymer A, and a treatment liquid that contains water and at least one selected from the group consisting of a polyvalent metal salt, an acidic compound, and a cationic polymer, a content ratio of the water-soluble polymer B to the pigment dispersion polymer A is 1.6 or more in terms of a mass, and the pigment dispersion polymer A and the water-soluble polymer B satisfy the followings.

The pigment dispersion polymer A contains at least one acid group selected from the group consisting of a phosphoric acid group, a sulfonic acid group, a carboxylic acid group, and an aromatic ring.

The water-soluble polymer B contains at least one acid group selected from the group consisting of a phosphoric acid group, a sulfonic acid group, and a carboxylic acid group, and a constitutional unit represented by Formula (1).

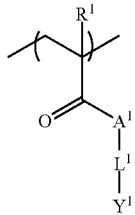

General Formula (1)

In General Formula (1), $R^1$ represents a hydrogen atom or an alkyl group having 1 to 4 carbon atoms.

$A^1$ represents —O—.

$L^1$ represents a divalent linking group that is one kind selected from the group A consisting of an alkylene group, an alkenylene group, an alkynylene group, an arylene group, —O—, and —C(=O)—, or a divalent linking group that is obtained by combining two or more kinds selected from the group A.

$Y^1$ represents —OH, —$R^2$, —$OR^2$, —$NH_2$, —$NHR^2$, —$NR^2R^3$, or —SH.

$R^2$ and $R^3$ each independently represent an alkyl group having 1 to 3 carbon atoms, an alkenyl group having 2 or 3 carbon atoms, or an alkynyl group having 2 or 3 carbon atoms.

In the related art, an image recording method by, for example, an ink jet method using an ink set containing an ink composition and a treatment liquid for aggregating components in the ink composition has been known.

As the ink composition constituting the ink set, from the viewpoint of enhancing the accuracy of an image, an ink composition containing fine particles of a resin may be used, for example, as in JP6432895B. The aggregated state of the ink composition containing the fine particles of the resin in the image is not uniform in a case where the treatment agent acts during recording, depending on a content of the fine particles or the like, so that unexpected shades of color may partially appear in the recorded image. The shades of color in the image may be one cause of giving a rough impression to the image visually (so-called graininess) or deteriorating the uniformity of image density. That is, during recording of the image, a plurality of ink droplets that are adjacent to each other and applied onto a recording medium may interfere with each other. In a cluster of the plurality of ink droplets, adjacent ink droplets may interfere with each other, and some ink droplets may be affected by other ink droplets, thereby the ink droplets moving from a landing position. Such a phenomenon causes various density unevenness in the image.

On the other hand, as an ink composition used in a recording method in which a treatment liquid that aggregates components in an ink composition is not used, an ink containing a water-soluble polymer as a polymer component has also been proposed. However, since the water-soluble polymer generally tends to significantly increase the viscosity of a water-based ink, jettability of the ink composition being jetted from an ink jet head is significantly impaired in a case where the ink composition simply contains the water-soluble polymer.

In view of the above description, in the ink set of the present disclosure, the ink composition of the ink set further contains the water-soluble polymer B that precipitates in a case where the treatment liquid acts and that exhibits a thickening action, in addition to the pigment and the pigment dispersion polymer A that disperses the pigment. As a result, the viscosity of the ink composition increases in a case where the ink composition is applied to a treatment liquid-applied surface of the recording medium. That is, in the present disclosure, the treatment liquid acts in the ink composition to cause a thickening action associated with the precipitation of the water-soluble polymer B, and also to cause an aggregating action of the pigment. As a result, the movement of ink droplets (ink dots) is suppressed by the thickening action due to the precipitation of the water-soluble polymer B, so that the image is accurately formed by the aggregating action of the pigment, and a partial change in shades of color also decreases. Therefore, in the image, unevenness (bleeding) of the density, which appears due to existence of a part where the ink droplets interfere with each other (for example, the movement and coalescence of liquid droplets) and a part where the ink droplets do not interfere with each other, is suppressed to a low level. In the ink set and the image recording method of the present disclosure, the aggregating action of pigment particles and the thickening action of the water-soluble polymer B are combined to suppress uneven density (bleeding), which contributes to the improvement of image quality. In addition, a region in which the ink composition does not exist, that is, a phenomenon in which cracking of an image occurs is also suppressed since the water-soluble polymer B having a hydrophilic structure is present in the ink composition. Furthermore, since the ink composition in the present disclosure selectively contains a specific water-soluble polymer B, the jettability of the ink composition is not significantly impaired.

The ink set of the present disclosure includes a specific ink composition and a treatment liquid. In this ink composition, a ratio (a $D^B/D^A$ ratio) of a content concentration ($D^B$) of the water-soluble polymer B to a content concentration ($D^A$) of the pigment dispersion polymer A in a liberated polymer (hereinafter, also referred to as a "liberation polymer") is 1.6 or more in terms of a mass.

The fact that the $D^B/D^A$ ratio is 1.6 or more means that a content of the water-soluble polymer B contained in the liberation polymer of the ink composition is greater than a content of the pigment dispersion polymer A, that is, it shows that the water-soluble polymer B is dissolved in water in a larger amount than the pigment dispersion polymer A. In other words, it means that the water-soluble polymer B has a property (water-soluble) that is more easily liberated than the pigment dispersion polymer A.

The liberated polymer (liberation polymer) refers to a polymer that does not adhere to a surface of the pigment in the ink composition and that is floated in water and a solvent, and refers to all of polymers that do not adhere to the pigment and are in a liberated state (including the pigment dispersion polymer A and the water-soluble polymer B).

The larger the $D^B/D^A$ ratio, the more preferable it is from the viewpoint of functional separation between the water-soluble polymer B and the pigment dispersion polymer A. As the $D^B/D^A$ ratio increases, the dispersibility of the pigment and the aggregability of the ink composition can be further enhanced.

The $D^B/D^A$ ratio is more preferably 2 or more, still more preferably 3 or more, and particularly preferably 5 or more.

The upper limit value of the $D^B/D^A$ ratio is not particularly limited, and may be, for example, 250 since the amount of the pigment dispersion polymer A liberated in the ink composition may be small.

The content concentration ($D^A$) of the pigment dispersion polymer A and the content concentration ($D^B$) of the water-soluble polymer B in the liberated polymer of the ink composition are values calculated by any one of the following method (a) or method (b), and the $D^B/D^A$ ratio can be obtained from the calculated value.

Method (a): a pigment dispersion that has been used is centrifuged at a rotation speed of 10,000 revolutions per minute (rpm) for 30 minutes, a solid content of a supernatant is measured, and the measured value is multiplied by the amount of the pigment dispersion added in an ink composition to obtain $D^A$. The content concentration ($D^B$) of the water-soluble polymer B is a content concentration of the water-soluble polymer B dissolved in the ink composition.

Method (b): an ink composition is centrifuged at a rotation speed of 10,000 rpm for 30 minutes, a precipitated pigment dispersion is extracted using a highly polar organic solvent, and component analysis is performed by a spectroscopic method or a nuclear magnetic resonance (NMR) method, thereby specifying a content ratio of a structure and constitutional monomers of the pigment dispersion polymer A. The highly polar organic solvent used herein is appropriately selected depending on a type of polymer intended for extraction. Subsequently, the ink composition is centrifuged at a rotation speed of 80,000 rpm for 1 hour to separate the pigment dispersion polymer A and the water-soluble polymer B, which are liberated in the supernatant, and the pigment dispersion polymer A is separated from the water-soluble polymer B by GPC or reprecipitation. Then, the separated water-soluble polymer B is subjected to component analysis by a spectroscopic method or a nuclear magnetic resonance (NMR) method to specify a content ratio of a structure and constitutional monomers of the water-soluble polymer B. A content concentration ($D^A$) of the pigment dispersion polymer A and a content concentration ($D^B$) of the water-soluble polymer B in the liberation polymer are calculated from a result of the component analysis of the liberation polymer in the supernatant and each structural analysis.

The pigment dispersion polymer A preferably has hydrophobicity as compared with the water-soluble polymer B, that is, a C log P is preferably larger than a C log P of the water-soluble polymer B, from the viewpoint that the pigment dispersion polymer A easily adheres to the pigment to enhance the dispersibility. The C log P of the pigment dispersion polymer A is preferably 1.75 or more, more preferably 1.80 or more, and still more preferably 1.85 or more.

On the other hand, the water-soluble polymer B preferably has hydrophilicity as compared with the pigment dispersion polymer A, that is, the C log P is preferably smaller than the C log P of the pigment dispersion polymer A, from the viewpoint that the water-soluble polymer B is dissolved in the ink composition and contributes to the thickening of the ink composition in a case where the treatment liquid (specifically, an aggregation component such as acids) acts. The C log P of the water-soluble polymer B is preferably 1.80 or less, more preferably 1.74 or less, still more preferably 1.72 or less, and still more preferably 1.70 μm or less.

A C log P indicates that the larger the value, the higher the hydrophobicity.

The C log P is calculated using ChemDraw (registered trademark) Professional (ver. 16.0.1.4) manufactured by PerkinElmer Informatics.

A C log P of each polymer is calculated as a C log P of a monomer for forming the polymer. Regarding a C log P of a polymer that is a copolymer, a weighted average value of a C log P of a monomer for forming the copolymer is regarded as the C log P of the copolymer.

For example, a C log P of polyacrylic acid is calculated as a C log P of acrylic acid. In addition, a C log P of the polyacrylic acid-polymethacrylic acid copolymer (copolymerization mass ratio=50:50) is calculated as a total value obtained by multiplying each of the C log P of the acrylic acid and the C log P of the methacrylic acid by a copolymerization mass ratio (in this case, 0.5 for each).

In a case where a constitutional unit containing a neutralized acid group (for example, —COONa) is present in a polymer, a C log P of an anion obtained by subtracting a counter cation (for example, $Na^+$) from a monomer containing a neutralized acid group (for example, —COONa) is adopted as a C log P of a monomer for forming this constitutional unit.

In a case where a polymer contained in the ink composition is unknown, a structure and a content ratio of the polymer are specified by performing component analysis on the ink composition by a spectroscopic method or a nuclear magnetic resonance (NMR) method to calculate a C log P of the Polymer.

<A> Ink Composition

The ink composition in the present disclosure contains water, the pigment, the pigment dispersion polymer A, and the water-soluble polymer B different from the pigment dispersion polymer A. The ink composition in the present disclosure preferably contains a water-soluble organic solvent and a surfactant, and may further contain other components, as necessary.

—Pigment—

The ink composition in the present disclosure contains at least one pigment.

The pigment is contained as a component for coloration of the ink composition, and can be appropriately selected from known pigments according to a desired hue. Pigments include an organic pigment and an inorganic pigment.

Examples of the organic pigment include an azo pigment, a polycyclic pigment, a chelate dye, a nitro pigment, a nitroso pigment, and aniline black. Among these, an azo pigment or a polycyclic pigment is preferable.

Examples of the azo pigment include an azo lake, an insoluble azo pigment, a condensed azo pigment, and a chelated azo pigment.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment.

Examples of the chelate dye include a basic dye-type chelate, and an acid dye-type chelate.

Examples of the inorganic pigment include titanium oxide, iron oxide, calcium carbonate, barium sulfate, aluminum hydroxide, Barium Yellow, Cadmium Red, Chrome Yellow, and carbon black.

Specific examples of the pigment include pigments described in paragraphs 0142 to 0145 of JP2007-100071A.

A volume average particle diameter of the pigment is preferably 10 nm to 200 nm, more preferably 10 nm to 150 nm, and still more preferably 10 nm to 100 nm. In a case where the volume average particle diameter is 200 nm or less, satisfactory color reproducibility is obtained, and in a case where an image is recorded by an ink jet method, satisfactory jetting properties are obtained. In a case where the volume average particle diameter is 10 nm or more, satisfactory light resistance is obtained.

There are no particular limitations on the particle size distribution of the pigment in the ink composition, and the particle size distribution may be any one of a wide particle size distribution and a monodisperse particle size distribution. In addition, two or more pigments each having a monodisperse particle size distribution may be used as a mixture.

The volume average particle diameter and the particle size distribution of the pigment in the ink composition are values measured by a particle size distribution measuring device using light scattering (for example, Microtrac UPA (registered trademark) EX150 manufactured by Nikkiso Co., Ltd.).

A content of the pigment in the ink composition is not particularly limited and may be appropriately selected according to the purpose, application, and the like. The content of the pigment in the ink composition is preferably 1% by mass to 20% by mass, and more preferably 1% by mass to 10% by mass with respect to a total solid content of the ink composition, from the viewpoint of colorability and storage stability.

—Pigment Dispersion Polymer A—

The ink composition in the present disclosure contains at least one pigment dispersion polymer A.

The pigment dispersion polymer A is a polymer that adheres to a part or the entire surface of the pigment and functions as a dispersing agent to disperse the pigment. That is, a preferable aspect of the ink composition is an aspect in which at least a part of the total amount of the pigment dispersion polymer A adheres to a part or the entire surface of the pigment.

The pigment dispersion polymer A at least contains at least one acid group selected from the group consisting of a phosphoric acid group, a sulfonic acid group, a carboxylic acid group, and an aromatic ring.

The pigment dispersion polymer A contains at least one acid group selected from the group consisting of a phosphoric acid group, a sulfonic acid group (a sulfo group), and a carboxylic acid group (a carboxy group). The dispersibility of a hydrophobic pigment in water can be enhanced by including an acid group.

The pigment dispersion polymer A preferably contains a carboxylic acid group as an acid group.

The acid group may be introduced into the polymer by polymerization of a monomer containing the acid group. The pigment dispersion polymer A preferably contains a constitutional unit derived from a monomer containing an acid group.

Specific examples of the constitutional unit derived from a monomer containing an acid group are as follows. The present disclosure is not limited thereto.

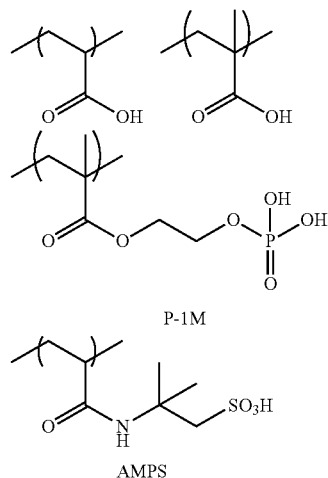

In a case where the pigment dispersion polymer A is a copolymer containing the constitutional unit derived from a monomer containing an acid group, a content ratio of the constitutional unit derived from a monomer containing an acid group in the pigment dispersion polymer A is preferably 5% by mass to 40% by mass and more preferably 8% by mass to 20% by mass with respect to all constitutional units of the pigment dispersion polymer A, from the viewpoint of the pigment dispersibility.

The pigment dispersion polymer A contains an aromatic ring. The aromatic ring may be introduced into the polymer by polymerization of a monomer containing an aromatic ring as a constitutional unit derived from a monomer containing an aromatic ring. Since the aromatic ring is present in the pigment dispersion polymer to be hydrophobic, the pigment dispersion polymer A easily adheres to the pigment, and the stability of the pigment in water can be enhanced.

The aromatic ring is a cyclic unsaturated ring with aromaticity.

Examples of the aromatic ring include aromatic hydrocarbon rings such as a benzene ring, a naphthalene ring, an anthracene ring, and a pyrene ring; and heteroaromatic rings such as a pyridine ring, a pyrrole ring, a furan ring, a thiophene ring, an imidazolyl ring, and an acridone ring; and the like. Among these, an aromatic hydrocarbon ring is preferable.

As the monomer containing an aromatic ring, a monomer containing an aromatic ring and an ethylenically unsaturated double bond is preferable, and a vinyl monomer containing an aromatic ring is more preferable. Examples of the monomer containing an aromatic ring include styrene, methylstyrene, divinylbenzene, vinylpyridine, diallyl phthalate, and the like, and (meth)acrylate containing an aromatic ring (for example, benzyl acrylate, phenoxyethyl acrylate, and the like).

The monomer containing an aromatic ring may be unsubstituted or may be a substituted monomer substituted with a substituent. Examples of the substituent include a halogen atom, an alkyl group, a carboxylic acid group, a hydroxyl group, and the like.

Examples of the halogen atom include chlorine, bromine, iodine, and the like.

As the alkyl group, an alkyl group having 1 to 12 carbon atoms (preferably 1 to 8 carbon atoms) is preferable, and examples thereof include a methyl group, an ethyl group, a propyl group, a butyl group, hexyl group, and the like. The alkyl group may be unsubstituted or may have a substituent similar to the above.

Specific examples of the constitutional unit derived from a monomer containing an aromatic ring are as follows. The present disclosure is not limited to the following specific examples. "*" in each structure indicates a bonding site. "iBu" represents isobutyl, "nBu" represents normal butyl, and "tBu" represents tertiary butyl.

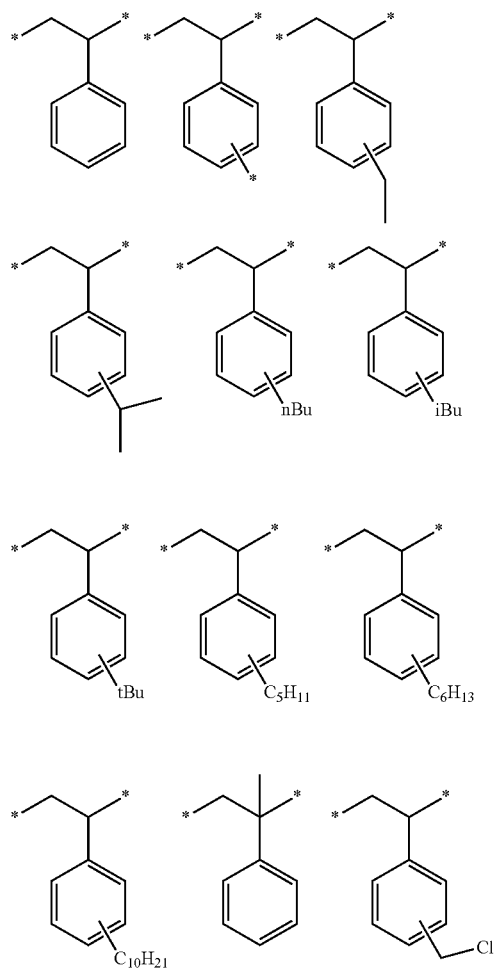

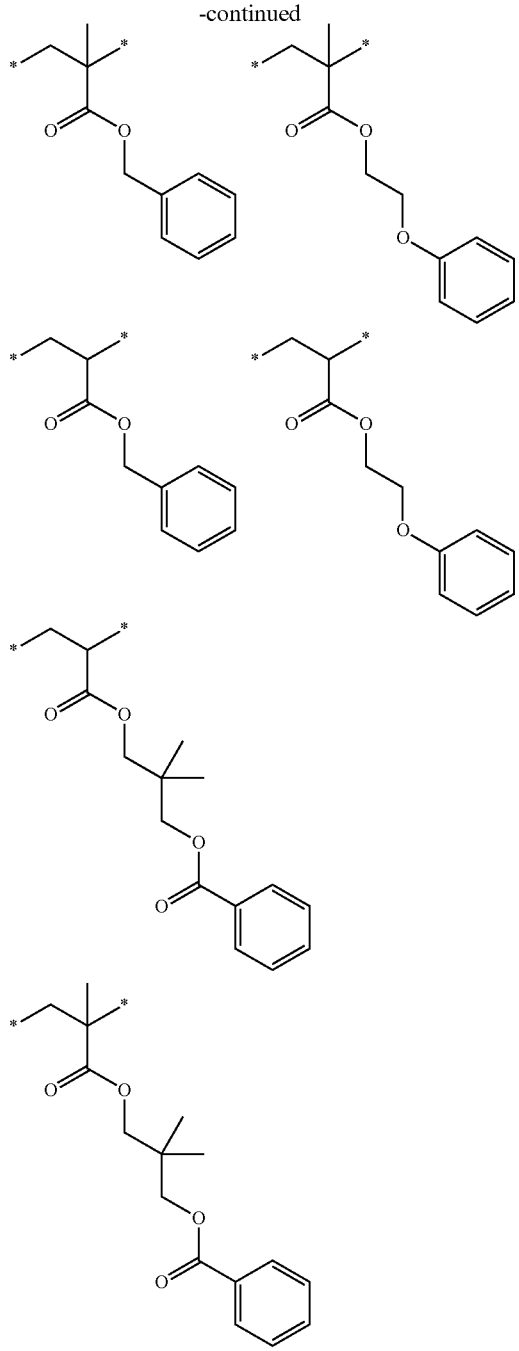

A content of the constitutional unit derived from a monomer containing an aromatic ring in the pigment dispersion polymer A is preferably 50% by mass to 85% by mass, more preferably 60% by mass to 80% by mass with respect to all constitutional units in one molecule of the pigment dispersion polymer A.

The pigment dispersion polymer A can contain a constitutional unit derived from a monomer containing no aromatic ring, in addition to the constitutional unit derived from a monomer containing an aromatic ring.

Suitable examples of the constitutional unit derived from a monomer containing no aromatic ring can include alkyl (meth)acrylate and the like.

As the alkyl (meth)acrylate, alkyl (meth)acrylate with an alkyl moiety having 1 to 20 carbon atoms is preferable.

Examples of the alkyl (meth)acrylate include methyl (meth)acrylate, ethyl (meth)acrylate, butyl (meth)acrylate, stearyl (meth)acrylate, and the like.

Specific examples of the pigment dispersion polymer A include the following copolymers. A mass ratio of monomers in each copolymer can be appropriately selected within a range satisfying a range of a weight-average molecular weight. The present disclosure is not limited to the following specific examples.

Benzyl methacrylate/acrylic acid copolymer
Benzyl methacrylate/methacrylic acid copolymer
Styrene/acrylic acid/stearyl acrylate copolymer
Styrene/acrylic acid/stearyl methacrylate copolymer
Benzyl methacrylate/methacrylic acid/stearyl methacrylate copolymer
Phenoxyethyl methacrylate/methacrylic acid/stearyl methacrylate copolymer
Phenoxyethyl methacrylate/methacrylic acid/stearyl methacrylate/hydroxyethyl methacrylate copolymer An acid value of the pigment dispersion polymer A is preferably 50 mgKOH/g to 180 mgKOH/g, more preferably 50 mgKOH/g to 150 mgKOH/g, and still more preferably 50 mgKOH/g to 120 mgKOH/g, from the viewpoint of the dispersibility and dispersion stability of the pigment.

The acid value can be measured by titration of an indicator, and is a value measured by a method described in Japanese Industrial Standards (JIS) K0070: 1992.

A weight-average molecular weight (Mw) of the pigment dispersion polymer A is preferably 1,000 to 100,000 and more preferably 10,000 to 50,000.

A content of the pigment dispersion polymer A in the ink composition is preferably 10% by mass to 80% by mass and more preferably 25% by mass to 70% by mass with respect to the amount of the pigment, from the viewpoint of obtaining satisfactory dispersibility of the pigment.

—Water-soluble Polymer B—

The ink composition in the present disclosure contains at least one water-soluble polymer B.

The water-soluble polymer B is a polymer different from the pigment dispersion polymer A and is water-soluble.

In the present disclosure, the "water-soluble" in the water-soluble polymer B means a property that the amount dissolved in 100 g of water at 25° C. is 1 g or more.

In the present disclosure, the concept that "the amount dissolved in 100 g of water at 25° C. is 1 g or more" includes the fact that the total amount of an object is dissolved in a case where 100 g of water at 25° C. is added to 1 g of the object (that is, the polymer) and stirred at 25° C., and the fact that a state in which the total amount of the object is dissolved at 25° C. is maintained for 1 hour or more in a case where the total amount of 1 g of the object is dissolved in 100 g of water under heating by higher than 25° C., and the temperature of the obtained solution is lowered to 25° C.

Herein, "the total amount of 1 g of the object is dissolved in 100 g of water under heating by higher than 25° C." means that the total amount of 1 g of the object is dissolved in 100 g of water by performing at least one of an operation of adding 100 g of water at higher than 25° C. to 1 g of the object and an operation of heating a sample that is obtained by adding 100 g of water to 1 g of the object to higher than 25° C.

The water-soluble polymer B may be a water-soluble polymer obtained by neutralizing a carboxylic acid group in a water-insoluble polymer containing the carboxylic acid group (that is, a polymer having a dissolution amount of less than 1 g in 100 g of water at 25° C.).

The water-soluble polymer B is preferably dissolved in 100 g of water at 25° C. in an amount of 3 g or more (more preferably 10 g or more). The meaning of "dissolved in 100 g of water at 25° C. in an amount" is as described above.

The water-soluble polymer B is preferably a polymer having higher water-solubility than the pigment dispersion polymer A. It is preferable that the water-soluble polymer B is present in the ink composition in a dissolved state rather than being present on the surface of the pigment to modify the pigment.

The water-soluble polymer B contains at least one acid group selected from the group consisting of a phosphoric acid group, a sulfonic acid group, and a carboxylic acid group, and a constitutional unit represented by General Formula (1). The thickening action can be easily obtained by containing the water-soluble polymer B in a case where the treatment liquid acts even in a small amount, and a film formation property is excellent. In addition, since a molecule contains a specific hydrophilic structure, the permeability of an ink is increased, and cracks are less likely to occur in the recorded image.

The water-soluble polymer B contains at least one acid group selected from the group consisting of a phosphoric acid group, a sulfonic acid group (that is, a sulfo group), and a carboxylic acid group (that is, a carboxy group). It is possible to exhibit the thickening action of the ink composition by containing an acid group in a case where the treatment liquid acts in the ink composition. Therefore, image bleeding is suppressed. Among the acid groups, the carboxylic acid group is preferable in that the carboxylic acid group easily exhibits the thickening action of the ink composition and further suppresses bleeding.

In addition, in a case of an acid group in the water-soluble polymer B, the acid group is preferably neutralized with a base for the same reason as described above.

The base is not limited as long as it can neutralize the acid group. Examples of the base include inorganic bases such as alkali metal hydroxides, alkaline earth metal hydroxides, and organic bases such as organic amines.

Examples of the alkali metal include potassium (K) and sodium (Na).

Examples of the alkaline earth metal include calcium (Ca) and magnesium (Mg).

Examples of the alkali metal hydroxides include potassium hydroxide, sodium hydroxide, and the like.

Examples of the alkaline earth metal hydroxides include calcium hydroxide and magnesium hydroxide.

Examples of the organic amines include ammonia, a primary amine (for example, ethylamine, monoethanolamine, and the like), a secondary amine (for example, diethylamine, ethylenediamine, and the like), and a tertiary amine (for example, triethylamine, triethanolamine, isopropylethylamine, pyrrolidine, piperidine, and the like), and a quaternary ammonium salt. Among these, as the organic amine, an organic amine having a boiling point of 80° C. or higher is preferable from the viewpoint of storage stability.

From the viewpoint of the storage stability, the base is preferably an alkali metal hydroxide or an organic amine, and more preferably an alkali metal hydroxide or an organic amine having a boiling point of 80° C. or higher.

Examples of the organic amine having a boiling point of 80° C. or higher include ethylenediamine (117° C.), triethylamine (90° C.), monoethanolamine (170° C.), triethanolamine (208° C.), isopropylethylamine (127° C.), and pyrrolidine (87° C.), piperidine (106° C.), and the like.

A content of the acid group in the water-soluble polymer B is preferably 5% by mass to 40% by mass and more preferably 7% by mass to 25% by mass, from the viewpoint of exhibiting the satisfactory thickening action of the ink composition during the recording.

The water-soluble polymer B preferably contains a carboxylic acid group as an acid group from the viewpoint of exhibiting the satisfactory thickening action of the ink composition during the recording.

Furthermore, from the viewpoint of further suppressing pigment fixation inside a jetting head and further improving the maintainability, the water-soluble polymer B contains a carboxylic acid group as an acid group, and 40% by mol or more of the carboxylic acid group is preferably neutralized with a base.

In this case, a ratio of the neutralized carboxylic acid group to the total carboxylic acid group (hereinafter, also referred to as a "neutralization degree of a carboxylic acid group") is preferably 50% by mol or more, more preferably 60% by mol or more, and still more preferably 80% by mol or more. The upper limit of the neutralization degree of the carboxylic acid group (that is, the ratio of the neutralized carboxylic acid group) can be 100% by mol.

The acid group may be introduced into the water-soluble polymer B by polymerization of a monomer containing an acid group. The water-soluble polymer B preferably contains a constitutional unit derived from a monomer containing an acid group.

Specific examples of the constitutional unit derived from a monomer containing an acid group are as follows. The present disclosure is not limited thereto.

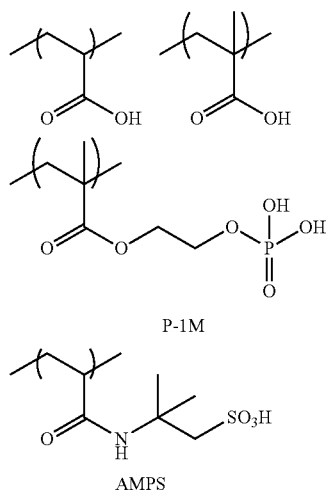

In a case where the water-soluble polymer B is a copolymer containing the constitutional unit derived from a monomer containing an acid group, a content ratio of the constitutional unit derived from a monomer containing an acid group in the water-soluble polymer B is preferably 5% by mass to 40% by mass and more preferably 8% by mass to 20% by mass with respect to all constitutional units of the water-soluble polymer B, from the viewpoint of exhibiting the satisfactory thickening action of the ink composition during the recording.

Next, the constitutional unit represented by General Formula (1) will be described in detail.

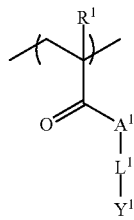

General Formula (1)

In General Formula (1), $R^1$ represents a hydrogen atom or an alkyl group having 1 to 4 carbon atoms.

The alkyl group having 1 to 4 carbon atoms may be unsubstituted or may have a substituent. Examples of the alkyl group having 1 to 4 carbon atoms include a methyl group, an ethyl group, a propyl group, an n-butyl group, and the like, and a methyl group is preferable.

Examples of the substituent in a case where the alkyl group has a substituent include a halogen atom, an alkyl group, a carboxylic acid group, a hydroxyl group, an amino group, an acyl group, an acyloxy group, and the like (hereinafter, referred to as a "substituent group X").

Examples of the halogen atom include chlorine, bromine, iodine, and the like.

As the alkyl group, an alkyl group having 1 to 12 carbon atoms (preferably 1 to 8 carbon atoms) is preferable, and examples thereof include a methyl group, an ethyl group, a propyl group, a butyl group, hexyl group, and the like. The alkyl group may be unsubstituted or may have a substituent similar to the above.

In the present disclosure, the substituent having a substituent refers to the above-described substituent group X.

In General Formula (1), $A^1$ represents —O—.

In General Formula (1), $L^1$ represents a divalent linking group that is one kind selected from the group A consisting of an alkylene group, an alkenylene group, an alkynylene group, an arylene group, —O—, and —C(=O)—, or a divalent linking group that is obtained by combining two or more kinds selected from the group A.

The alkylene group in the group A may be unsubstituted or may have a substituent, and is preferably an alkylene group having 1 to 8 carbon atoms and more preferably an alkylene group having 1 to 4 carbon atoms. Examples of the alkylene group include a methylene group, an ethylene group, an i-propylene group, an n-butylene group, a t-butylene group, and the like.

The alkenylene group in the group A may be unsubstituted or may have a substituent, and is preferably an alkenylene group having 2 to 8 carbon atoms and more preferably an alkenylene group having 2 to 4 carbon atoms. Examples of the alkenylene group include vinylene, 1-methylvinylene, propenylene, 2-butenylene, a 2-pentenylene group, and the like.

The alkynylene group in the group A may be unsubstituted or may have a substituent, and is preferably an alkynylene group having 2 to 8 carbon atoms and more preferably an alkynylene group having 2 to 4 carbon atoms. Examples of the alkynylene group include ethynylene, propynylen, butynylene, 1,3-butadiynylene, 2-pentynylene, 2,4-pentadiynylene, 2-hexynylene, 3-heptynylene, 4-octynylen, and the like.

The arylene group in the group A may be unsubstituted or may have a substituent, and is preferably an arylene group having 6 to 10 carbon atoms and more preferably an arylene group having 6 to 8 carbon atoms.

In $L^1$, examples of a divalent linking group that is obtained by combining two or more kinds selected from the group A include an alkyleneoxy group, an alkyl ester group, and the like.

Examples of the alkyleneoxy group include $-(C_2H_4O)_n-$ (n is an integer of 2 to 10), $-(C_3H_6O)_n-$ (n is an integer of 2 to 10), and the like.

Examples of the alkyl ester group include caprolactone-modified acrylate and the like.

Among these, as $L^1$, an alkylene group or an alkyleneoxy group is preferable, an alkylene group having 1 to 4 carbon atoms or an alkyleneoxy group having 2 and 3 carbon atoms is more preferable, and an alkylene group having 1 to 4 carbon atoms or an ethyleneoxy group [$-(C_2H_4O)_n-$ (n is an integer of 2 to 10)] is still more preferable.

Examples of the alkylene group having 1 to 4 carbon atoms include a methylene group, an ethylene group, an i-propylene group, an n-butylene group, and the like.

In General Formula (1), $Y^1$ represents $-OH$, $-R^2$, $-OR^2$, $-NH_2$, $-NHR^2$, $-NR^2R^3$, or $-SH$. $R^2$ and $R^3$ each independently represent an alkyl group having 1 to 3 carbon atoms, an alkenyl group having 2 or 3 carbon atoms, or an alkynyl group having 2 or 3 carbon atoms.

Examples of the alkyl group having 1 to 3 carbon atoms in $R^2$ and $R^3$ include a methyl group, an ethyl group, and a propyl group.

Examples of the alkenyl group having 2 or 3 carbon atoms in $R^2$ and $R^3$ include vinyl, 1-methylvinyl, and propenyl.

Examples of the alkynyl group having 2 or 3 carbon atoms in $R^2$ and $R^3$ include ethynyl and propynyl.

Among these, as Y', $-OH$, $-OR^2$, $-NHR^2$, or $-NR^2R^3$ is preferable, $-OH$, $-OR^2$, $-NHCH_3$ or $-N(CH_3)_2$ is more preferable, $-OH$ or $-OR^2$ is still more preferable, and $-OH$ is particularly preferable.

A specific example of the constitutional unit represented by General Formula (1) is as follows. "*" in each structure indicates a bonding site.

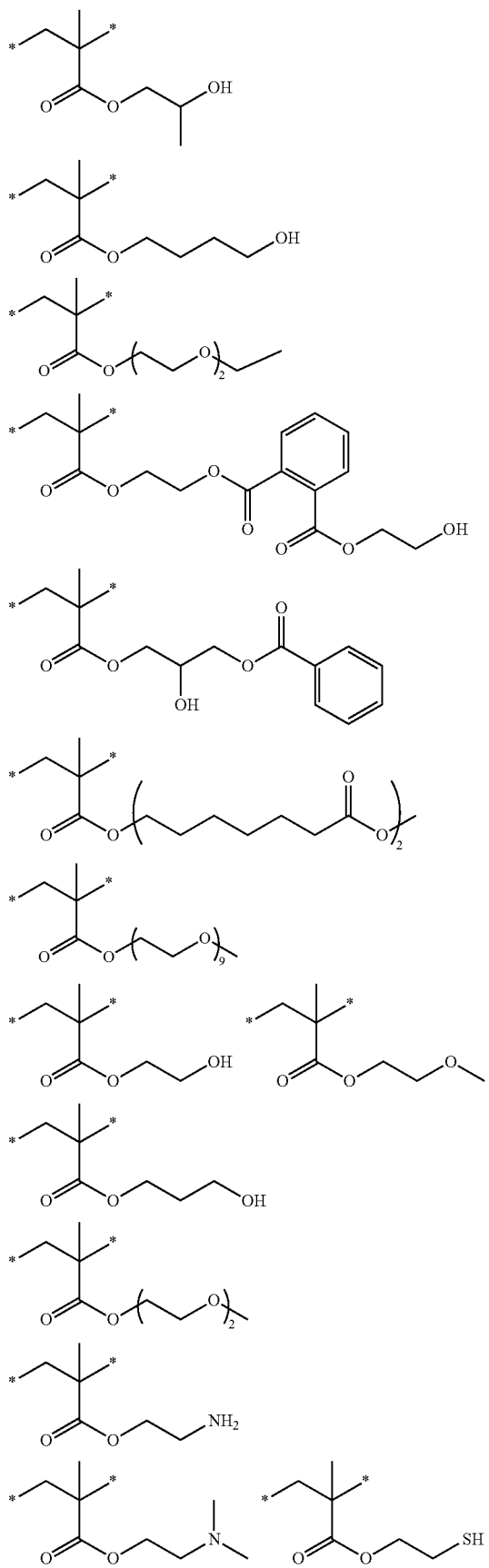

-continued

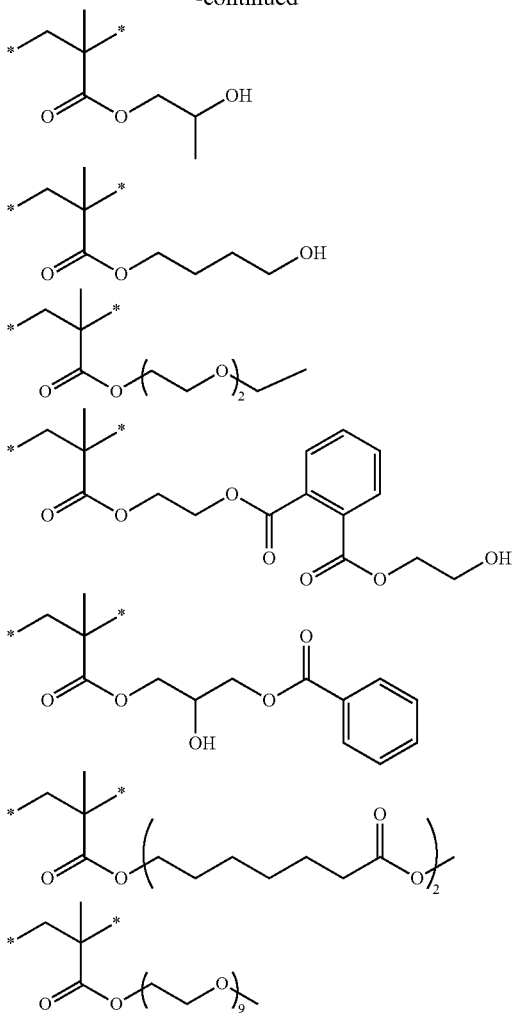

As monomers for forming the constitutional unit that is represented by General Formula (1) and that contains an ethyleneoxy group [—(C$_2$H$_4$O)$_n$— (n is an integer of 2 to 10)] as L$^1$, for example, Blemmer (registered trademark) series manufactured by NOF CORPORATION (Blemmer PME-100 (n=2), Blemmer PME-200 (n≈4), Blemmer PME-400 (n≈9), and the like as examples of polyalkylene glycol monomethacrylate, Blemmer AME-400 (n≈9), and the like as examples of polyalkylene glycol monoacrylate) and the like can be used.

A content ratio of the constitutional unit represented by General Formula (1) in the water-soluble polymer B is preferably 3% by mass to 45% by mass with respect to the total constitutional unit of the water-soluble polymer B. In a case where the content ratio of the constitutional unit represented by General Formula (1) is 3% by mass or more, the permeability of the ink composition due to the hydrophilic structure is improved, and the occurrence of cracking of an image is suppressed. In addition, in a case where the content ratio of the constitutional unit represented by General Formula (1) is 45% by mass or less, for example, in a case where the ink composition is jetted from the jetting head by an ink jet method to record an image, an affinity of the inside of the jetting head with the ink composition is suppressed, and the adhesion of the ink composition to the inside of the jetting head is suppressed. As a result, the maintainability of the jetting head is improved.

The content ratio of the constitutional unit represented by General Formula (1) is more preferably 3% by mass to 25% by mass and still more preferably 3% by mass to 20% by mass.

In the water-soluble polymer B, the total amount of the acid group and the constitutional unit represented by General Formula (1) is preferably 5% by mass to 80% by mass and more preferably 5% by mass to 45% by mass with respect to the solid content mass of the water-soluble polymer B. In a case where the total amount of the acid group and the constitutional unit represented by General Formula (1) is 5% by mass or more, satisfactory water solubility can be obtained, and the thickening action of the ink composition is likely to be exhibited. In a case where the total amount of the acid group and the constitutional unit represented by General Formula (1) is 45% by mass or less, the viscosity of the ink composition itself can be kept low, and for example, satisfactory jettability of the ink composition in a case where an image is recorded by an ink jet method is obtained. In addition, the maintainability of the jetting head is improved.

The total amount of the acid group and the constitutional unit represented by General Formula (1) is still more preferably 5% by mass to 40% by mass and particularly preferably 10% by mass to 35% by mass.

The water-soluble polymer B preferably further contains at least one constitutional unit selected from the group consisting of a constitutional unit represented by General Formula (A) and a constitutional unit represented by General Formula (B).

The constitutional unit represented by General Formula (A) or General Formula (B) is a hydrophobic monomer unit. Since the constitutional unit represented by General Formula (A) or General Formula (B) is contained, the affinity between the inside of the jetting head and the ink composition is lowered in a case where the jetting head that jets the ink composition is used, and the ink composition is less likely to adhere to the inside of the jetting head. As a result, the maintainability of the jetting head is further improved.

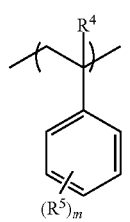

(A)

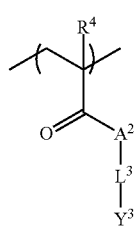

(B)

In General Formula (A) and General Formula (B), R$^4$'s each independently represent a hydrogen atom or a methyl group, and a methyl group is preferable.

In General Formula (A), R$^5$'s each independently represent an alkyl group, an alkenyl group, or an alkynyl group.

R$^5$ is present in a range of m, and m is an integer of 0 to 5. In terms of synthesis suitability, m is preferably 0 or 1. In a case where m is an integer of 2 or more, a plurality of $R^5$'s may be the same groups as each other or different groups from each other.

An alkyl group in $R^5$ may be unsubstituted or may have a substituent, and is preferably an alkyl group having 1 to 8 carbon atoms and more preferably an alkyl group having 1 to 4 carbon atoms. Examples of the alkyl group include a methyl group, an ethyl group, a propyl group, an n-butyl group, a t-butyl group, and the like.

An alkenyl group in $R^5$ may be unsubstituted or may have a substituent, and is preferably an alkenyl group having 2 to 8 carbon atoms and more preferably an alkenyl group having 2 to 4 carbon atoms. Examples of the alkenyl group include vinyl, 1-methylvinyl, propenyl, 2-butenyl, a 2-pentenyl group, and the like.

An alkynyl group in $R^5$ may be unsubstituted or may have a substituent, and is preferably an alkynyl group having 2 to 8 carbon atoms and more preferably an alkynyl group having 2 to 4 carbon atoms. Examples of the alkynyl group include ethynyl, propynyl, butynyl, 1,3-butadiynyl, 2-pentynyl, 2,4-pentadiynyl, 2-hexynyl, 3-heptynyl, 4-octynyl, and the like.

$A^2$ in General Formula (B) represents a single bond or —O—.

$A^2$ is more preferably —O—.

In General Formula (B), $L^3$ represents a divalent linking group that is one kind selected from the group B consisting of an alkylene group, an alkenylene group, an alkynylene group, —O—, and —C(=O)—, a divalent linking group that is obtained by combining two or more kinds selected from the group B, or a single bond.

$L^3$ in General Formula (B) is synonymous with $L^1$ in General Formula (1) except that $L^1$ may be a single bond, and the preferable aspects are the same.

$Y^3$ in General Formula (B) represents an alkyl group having 4 to 22 carbon atoms, an alkenyl group having 4 to 22 carbon atoms, an alkynyl group having 4 to 22 carbon atoms, a cycloalkyl group having 4 to 22 carbon atoms, or an aryl group having 6 to 22 carbon atoms. $Y^3$ is a group having a large number of carbon atoms and having a hydrophobic property.

An alkyl group having 4 to 22 carbon atoms may be unsubstituted or may have a substituent, and is preferably an alkyl group having 4 to 18 carbon atoms, more preferably an alkyl group having 4 to 16 carbon atoms, and still more preferably an alkyl group having 4 to 10 carbon atoms. Examples of the alkyl group include a normal butyl group, an isobutyl group, a 2-ethylhexyl group, an isooctyl group, a stearyl group, and the like.

An alkenyl group having 4 to 22 carbon atoms may be unsubstituted or may have a substituent, and is preferably an alkenyl group having 4 to 18 carbon atoms, more preferably an alkenyl group having 4 to 16 carbon atoms, and still more preferably an alkenyl group having 4 to 10 carbon atoms. Examples of the alkenyl group include a 2-methyl-propenyl group, a 2-butenyl group, a 3-methyl-2-butenyl group, and the like.

An alkynyl group having 4 to 22 carbon atoms may be unsubstituted or may have a substituent, and is preferably an alkynyl group having 4 to 18 carbon atoms, more preferably an alkynyl group having 4 to 16 carbon atoms, and still more preferably an alkynyl group having 4 to 10 carbon atoms. Examples of the alkynyl group include a 4-methyl-1-pentynyl group, a 3-3-dimethylbutynyl group, and the like.

A cycloalkyl group having 4 to 22 carbon atoms may be unsubstituted or may have a substituent, and is preferably a cycloalkyl group having 4 to 20 carbon atoms, more preferably a cycloalkyl group having 4 to 16 carbon atoms, and still more preferably a cycloalkyl group having 6 to 10 carbon atoms. Examples of the cycloalkyl group include a cyclohexyl group, a methylcyclohexyl group, a dimethylcyclohexyl group, an isobornyl group, a dicyclopentanyl group, an adamantane group, a 2-methyladamantan-2-yl group, a 2-ethyladamantan-2-yl group, a 2-isopropyladamantan-2-yl group, a norbornyl group, a methylnorbornyl group, and the like.

An aryl group having 6 to 22 carbon atoms may be unsubstituted or may have a substituent, and is preferably an aryl group having 6 to 20 carbon atoms, more preferably an aryl group having 6 to 16 carbon atoms, and still more preferably an aryl group having 6 to 10 carbon atoms. Examples of the aryl group include a phenyl group, a tolyl group, a xylyl group, an ethylphenyl group, a tert-butylphenyl group, an adamantylphenyl group, a biphenyl group, a naphthyl group, a 2,6-diethylphenyl group, and the like.

The water-soluble polymer B preferably contains at least one constitutional unit selected from the group consisting of a constitutional unit represented by General Formula (a) and a constitutional unit represented by any one of General Formulae (b-1), (b-2), (b-3), or (b-4) of the constitutional unit represented by General Formula (A) or General Formula (B).

(a)

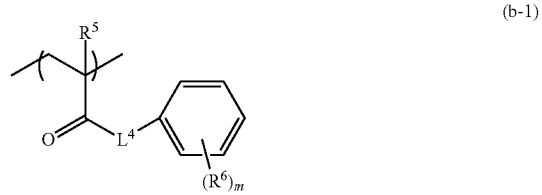

(b-1)

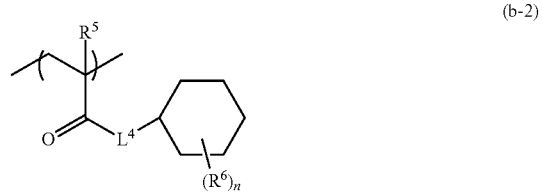

(b-2)

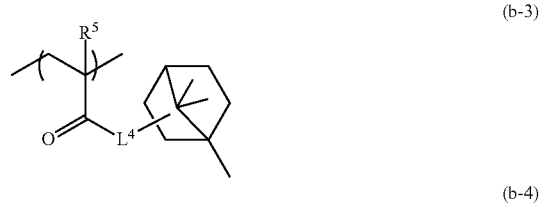

(b-3)

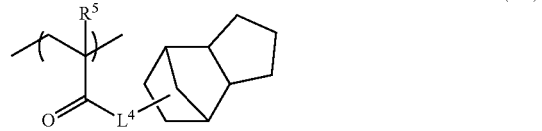

(b-4)

In General Formula (a) and General Formulae (b-1) to (b-4), $R^5$'s each independently represent a hydrogen atom or a methyl group. $R^5$ in General Formula (a) is preferably a hydrogen atom, and each of $R^5$'s in General Formulae (b-1) to (b-4) is preferably a methyl group.

In General Formula (a) and General Formulae (b-1) and (b-2), each of $R^6$'s represents an alkyl group, m represents an integer of 0 to 5, and n represents an integer of 0 to 11. Each $R^6$ is independently preferably a chain or branched alkyl group having 1 to 10 carbon atoms. Each $R^6$ independently preferably an alkyl group having 1 to 6 carbon atoms and more preferably an alkyl group having 1 to 4 carbon atoms. m is preferably an integer of 0 to 2 and more preferably 0 or 1. n is preferably an integer of 0 to 3 and more preferably 0 or 1.

In General Formulae (b-1) to (b-4), $L^4$'s each independently represent a divalent linking group that is one kind selected from the group C consisting of an alkylene group having 1 to 18 carbon atoms, —O—, and —C(=O)—, a divalent linking group that is obtained by combining two or more kinds selected from the group C, or a single bond.

Each $L^4$ is independently preferably —O—, *—O-alkylene group- (* represents a bonding site where a carbonyl group is bonded), or —O-alkylene group-O—.

Furthermore, the number of carbon atoms of the alkylene group in $L^4$ is preferably 1 to 12, more preferably 1 to 8, still more preferably 1 to 4, particularly preferably 1 or 2, and most preferably 1.

Specific examples of the constitutional unit represented by General Formula (a) and any one of General Formulae (b-1), (b-2), (b-3), or (b-4) are as follows.

"*" in each structure represents a bonding site. "nBu" represents "normal butyl", "iBu" represents "isobutyl", and "tBu" represents "tertiary butyl".

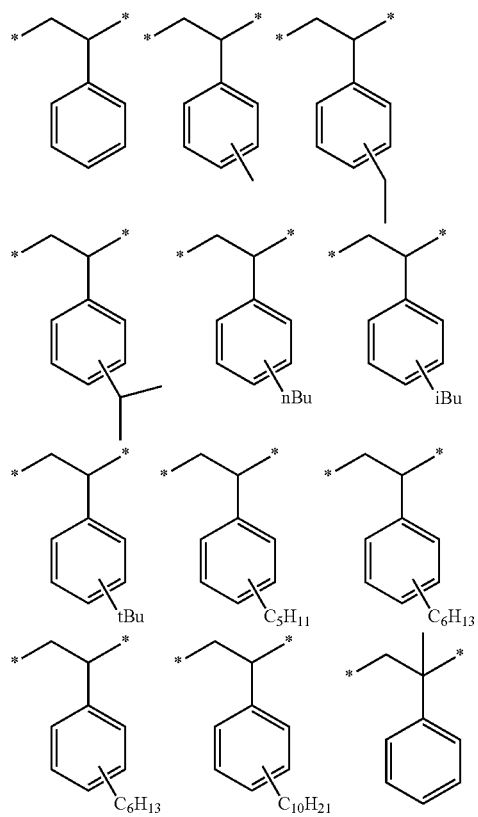

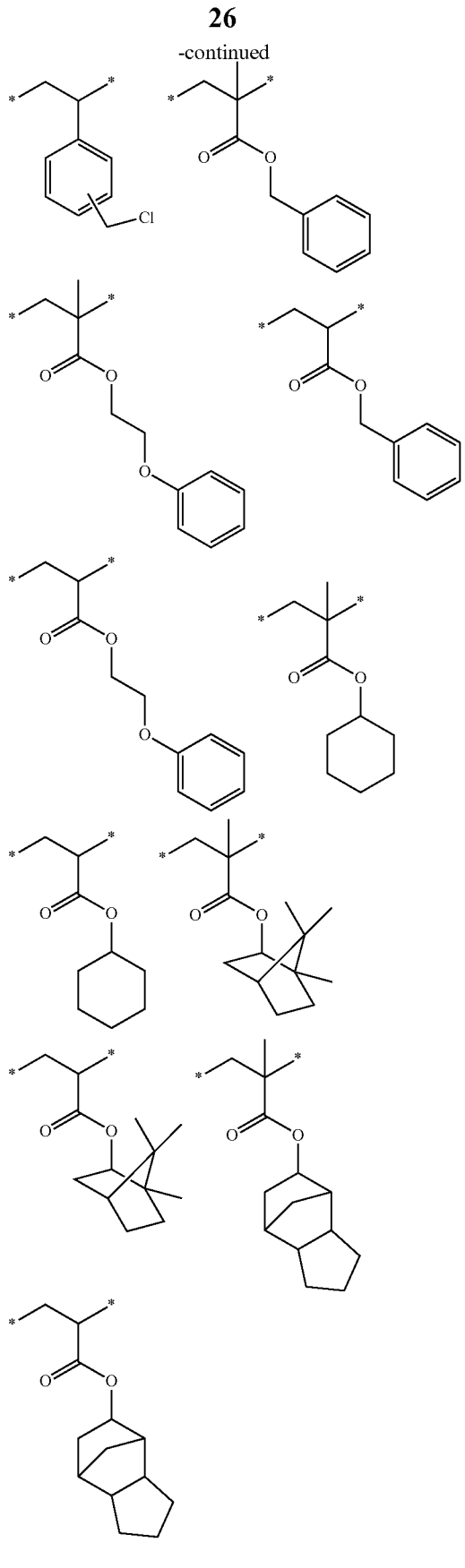

The total content ratio of the constitutional unit represented by General Formula (a) and the constitutional unit represented by any one of General Formulae (b-1), (b-2), (b-3), or (b-4) in the water-soluble polymer B is preferably 3% by mass to 80% by mass, more preferably 3% by mass to 50% by mass, and still more preferably 5% by mass to 50% by mass with respect to the total constitutional unit of the water-soluble polymer B.

Since the total content ratio of the constitutional unit represented by General Formula (A) and the constitutional unit represented by any one of General Formulae (b-1), (b-2), (b-3), or (b-4) is 3% by mass or more, the affinity between the inside of the jetting head and the ink composition is lowered in a case where the jetting head that jets the ink composition is used, and the ink composition is less likely to adhere to the inside of the jetting head. As a result, the maintainability of the jetting head is improved.

The total content ratio of the constitutional unit represented by General Formula (a) and the constitutional unit represented by any one of General Formulae (b-1), (b-2), (b-3), or (b-4) is still more preferably 10% by mass to 35% by mass.

The water-soluble polymer B may contain a constitutional unit derived from an alkyl (meth)acrylate having 1 to 3 carbon atoms in an alkyl moiety.

Examples of the alkyl (meth)acrylate having 1 to 3 carbon atoms in an alkyl moiety include methyl (meth)acrylate, ethyl (meth)acrylate, and propyl (meth)acrylate.

A content ratio of the constitutional unit derived from the alkyl (meth)acrylate having 1 to 3 carbon atoms in an alkyl moiety is preferably 3% by mass to 80% by mass, more preferably 5% by mass to 75% by mass, and still more preferably 15% by mass to 75% by mass with respect to the total constitutional unit of the water-soluble polymer B.

A weight-average molecular weight of the water-soluble polymer B is preferably 5,000 to 100,000. In a case where the weight-average molecular weight of the water-soluble polymer B is in the above range, a significant increase in the viscosity of the ink composition containing the water-soluble polymer is suppressed, and cracking of an image is less likely to occur. In addition, the satisfactory jettability can be obtained even in a case where the ink composition is jetted from the jetting head by an ink jet method.

The weight-average molecular weight of the water-soluble polymer B is more preferably 10,000 to 80,000 in terms of the jettability of the ink composition, and still more preferably 10,000 to 30,000 in terms of the jettability of the ink composition and suppression of cracking of an image.

The acid value of the water-soluble polymer B is preferably 28 mgKOH/g to 230 mgKOH/g. In a case where the acid value is 230 mgKOH/g or less, the thickening effect of the ink composition can be easily obtained even in a case where a small amount of the water-soluble polymer is used, and the bleeding in an image is suppressed. The acid value is more preferably 50 mgKOH/g or more and still more preferably 100 mgKOH/g or more, and may be 150 mgKOH/g or more, from the viewpoint of the thickening effect of the ink composition.

In a case where the acid value is in the above range, the occurrence of cracking of an image is suppressed.

The acid value can be measured by titration of an indicator in the same manner as that of the polymer A, and is a value measured by a method described in Japanese Industrial Standards (JIS) K0070: 1992.

A glass transition temperature (Tg) of the water-soluble polymer B is preferably 80° C. or higher. In a case where the Tg is 80° C. or higher, the ink composition is less likely to move on the recording medium. Therefore, the occurrence of cracking of an image after drying is further suppressed.

The Tg of the water-soluble polymer B is more preferably 95° C. or higher and still more preferably 110° C. or higher. The upper limit of Tg of the water-soluble polymer B is preferably 250° C. or lower in terms of synthesis suitability.

A sample obtained by drying a solution of a water-soluble polymer at 150° C. under reduced pressure for 6 hours is prepared and measured at a heating rate of 10° C./min by using a differential scanning calorimeter (DSC) to obtain Tg. As the DSC, for example, a differential scanning calorimeter (DSC) DSC7000X manufactured by Hitachi High-Tech Science Corporation can be used.

The content of the water-soluble polymer B in the ink composition is preferably 1% by mass to 5% by mass with respect to a total mass of the ink composition. In a case where the content of the water-soluble polymer B is 1% by mass or more, the thickening effect of the ink composition can be easily obtained. In a case where the content of the water-soluble polymer B is 5% by mass or less, a significant increase in viscosity of the ink composition is suppressed, and satisfactory jettability can be obtained even in a case where the ink composition is jetted from the jetting head by, for example, an ink jet method.

—Water—

The ink composition in the present disclosure contains water.

As the water, for example, ion exchange water or the like can be used.

A content of water is not particularly limited, but is preferably in a range of 10% by mass or more, more preferably in a range of 30% by mass or more, and still more preferably in a range of 50% by mass or more with respect to a total mass of the ink composition.

The upper limit of the content of the water depends on a content of another component, but is, for example, 99% by mass, 90% by mass, 80% by mass, and the like.

—Water-soluble Organic Solvent—

The ink composition in the present disclosure preferably contains a water-soluble organic solvent.

In the present disclosure, "water-soluble" in the water-soluble organic solvent means a property of dissolving 5 g or more in 100 g of water at 20° C.

Examples of the water-soluble organic solvent include alkanediols (polyhydric alcohol) such as glycerin, 1,2,6-hexanetriol, trimethylolpropane, ethylene glycol, and propylene glycol; sugar alcohols; an alkyl alcohol having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol diethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, triethylene glycol monomethyl ether, and tripropylene glycol monomethyl ether; amide compounds such as formamide, N,N-dimethylformamide, N,N-dimethylacetamide, 2-pyrrolidone, and N-methylpyrrolidone; and the like.

The water-soluble organic solvent can be used alone, or two or more may be used in combination.

The water-soluble organic solvent preferably contains a first organic solvent having a boiling point of 110° C. to 240° C. By the water-soluble organic solvent containing the first organic solvent, a content of the high boiling point solvent (for example, a second organic solvent having a boiling point of 245° C. to 300° C.) can be relatively reduced. As a result, the dryness can be improved, and the stickiness of an image can be suppressed.

Examples of the first organic solvent having a boiling point of 110° C. to 240° C. include ethylene glycol (198° C.), propylene glycol (188° C.), dipropylene glycol (230° C.), ethylene glycol monomethyl ether (124° C.), ethylene glycol diethyl ether (162° C.), propylene glycol monoethyl ether (120° C.), dipropylene glycol dimethyl ether (171° C.), diethylene glycol monomethyl ether (194° C.), diethylene glycol diethyl ether (188° C.), N-methylpyrrolidone (202° C.), and the like.

Examples of the second organic solvent having a boiling point of 245° C. to 300° C. include diethylene glycol (245° C.), glycerin (290° C.), 2-pyrrolidone (245° C.), triethylene glycol monomethyl ether (248° C.), and the like.

As the first organic solvent and the second organic solvent, an alcohol-based organic solvent and an ether-based organic solvent are preferable from the viewpoint of head maintainability. Compared to an organic solvent such as an amide compound (2-pyrrolidone, or the like) that easily interacts with a polymer component, the alcohol-based organic solvent and the ether-based organic solvent are less likely to adhere to the inside of the jetting head. Therefore, the satisfactory maintainability of the jetting head is obtained.

Specific examples of the alcohol-based organic solvent include ethylene glycol, propylene glycol, diethylene glycol, dipropylene glycol, glycerin, and the like.

Examples of the ether-based organic solvent include alkyl ether of the above described ethylene glycol, propylene glycol, diethylene glycol, dipropylene glycol, or glycerin, and the like.

Specific examples of the ether-based organic solvent include alkyl ethers such as ethylene glycol monomethyl ether, ethylene glycol diethyl ether, propylene glycol monoethyl ether, dipropylene glycol dimethyl ether, diethylene glycol monomethyl ether, and diethylene glycol diethyl ether.

In the present disclosure, each of the first organic solvent and the second organic solvent is preferably at least one alcohol-based organic solvent selected from the group consisting of ethylene glycol, diethylene glycol, propylene glycol, triethylene glycol, dipropylene glycol, glycerin, and an alkyl ether thereof.

In a case where the water-soluble organic solvent contains the first organic solvent and the second organic solvent, a mass ratio ($S^2/S^1$) of a content of the second organic solvent ($S^2$) to a content of the first organic solvent ($S^1$) is preferably in a range of 0 to 0.3. In a case where $S^2/S^1$ is in the above range, the amount of the organic solvent having a high boiling point is suppressed to a low level, so that the stickiness of an image after drying is suppressed.

$S^2/S^1$ is more preferably in a range of 0 to 0.2 for the same reason as described above.

The ink composition in the present disclosure may contain an organic solvent other than the above described water-soluble organic solvent as long as the effect in the present disclosure is not significantly impaired.

The total amount of the first organic solvent and the second organic solvent in the ink composition is preferably 5% by mass to 30% by mass with respect to a total mass of the ink composition.

In a case where the total amount of the first organic solvent and the second organic solvent is in the above range, the amount of the organic solvent is suppressed to a low level, so that the stickiness of an image after drying is suppressed. In a case where the total amount of the first organic solvent and the second organic solvent is 5% by mass or more, the occurrence of clogging of jetting holes due to the solidification of the ink composition generated at an air interface in the jetting head is suppressed, which causes the satisfactory jettability to be obtained.

The total amount of the first organic solvent and the second organic solvent is more preferably in a range of 7.5% by mass to 40% by mass, still more preferably in a range of 10% by mass to 30% by mass for the same reason as described above.

—Other Component—

In addition to the above described components, the ink composition in the present disclosure may further contain other components, as necessary, as long as the effect in the present disclosure is not significantly impaired.

Examples of other components include anti-drying agents (swelling agents), anti-coloring agents, penetration enhancer, ultraviolet absorbers, preservatives, rust inhibitors, antifoaming agents, viscosity regulators, pH adjusters, chelating agents, and the like.

~Physical Properties of Ink Composition~

1. Surface Tension

A surface tension of the ink composition is not particularly limited and may be, for example, 20 mN/m or more. From the viewpoint of coatability on the recording medium, the surface tension is preferably 25 mN/m to 40 mN/m and more preferably 27 mN/m to 37 mN/m.

The surface tension of the ink composition is a value measured by a plate method using an automatic surface tensiometer, CBVP-Z (manufactured by Kyowa Interface Science Co., Ltd.) under a condition of 25° C. The surface tension of the ink composition can be adjusted by, for example, adding a surfactant.

2. pH

The pH (25° C.±1° C.) of the ink composition is preferably 6 to 10 and more preferably 7 to 10.

The pH is a value measured by using a pH meter (for example, WM-50EG manufactured by DKK-TOA CORPORATION) in a state in which a temperature of a treatment liquid is adjusted to 25° C. in an environment of 25° C.

3. Viscosity

The viscosity of the ink composition is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s from the viewpoint of jettability in a case where the ink composition is jetted by an ink jet method.

The viscosity means a value measured under the condition of 25° C. The viscosity can be measured by using, for example, VISCOMETER TV-22 (manufactured by TOKI SANGYO CO. LTD.).

<B> Treatment Liquid

The treatment liquid in the present disclosure contains at least water and at least one selected from the group consisting of a polyvalent metal salt, an acidic compound, and a cationic polymer, and may further contain other components as necessary.

(Aggregation Component)

The treatment liquid in the present disclosure contains an aggregation component having an aggregating action to aggregate a component (particularly, a dispersion component such as the pigment) in the ink composition. The aggregation component in the present disclosure not only contributes to the aggregating action, but also contributes to the thickening action of the water-soluble polymer in the ink composition, and has a function of suppressing the occurrence of bleeding in an image.

The aggregation component is at least one compound selected from the group consisting of a polyvalent metal salt, an acidic compound, and a cationic polymer. The aggregation component is preferably an acidic compound from the viewpoint of the above described aggregating action and thickening action.

—Acidic Compound—

The acidic compound functions as an immobilizing agent capable of immobilizing the ink composition in a case where the acidic compound comes into contact with the ink composition on the recording medium. For example, in a case where the treatment liquid containing the acidic compound is applied to the recording medium (preferably coated paper), and the ink composition is applied to a treatment liquid-applied surface of the recording medium, at least a pigment dispersed in the ink composition can be aggregated and the water-soluble polymer B can be precipitated to thicken the ink composition.

As the acidic compound, an acid is preferable, and examples thereof include sulfuric acid, hydrochloric acid, nitric acid, phosphoric acid, polyacrylic acid, acetic acid, glycolic acid, malonic acid, malic acid, maleic acid, propane tricarboxylic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxalic acid, and benzoic acid.

From the viewpoint of achieving a balance between the suppression of volatilization and the solubility in a solvent, the acidic compound is preferably an acid having a molecular weight of 35 to 1,000, more preferably an acid having a molecular weight of 50 to 500, and particularly preferably an acid having a molecular weight of 50 to 200.

pKa (in $H_2O$, 25° C.) of the acid is preferably −10 to 7, more preferably 1 to 7, and still more preferably 1 to 5, from the viewpoint of achieving both prevention of bleeding of ink and photocurability.

As pKa, values calculated by Advanced Chemistry Development (ACD/Labs) Software V11. 02 (1994-2014 ACD/Labs) or values described in literature (for example, J. Phys. Chem. A 2011, 115, 6641-6645, and the like) can be used.

Among these, the acidic compound is preferably a highly water-soluble compound. As the acidic compound, a monovalent, divalent, or trivalent acid is preferable, and divalent and trivalent acids are more preferable, from the viewpoint of exhibiting the satisfactory aggregating action on the components in the ink composition and the satisfactory thickening action of the water-soluble polymer B.

In a case where the treatment liquid is an aqueous solution including an acidic compound, the pH (25° C.) of the treatment liquid is preferably 0.1 to 6.8, more preferably 0.1 to 6.0, and even more preferably 0.1 to 5.0.

The pH is a value obtained by adjusting the temperature of the treatment liquid to 25° C. and measuring the result at 25° C. using a pH meter. As the pH meter, for example, WM-50EG manufactured by DKK-TOA CORPORATION can be used.

In a case where the treatment liquid contains an acidic compound as an aggregation component, a content of the acidic compound in the treatment liquid is preferably 50% by mass or less, more preferably 15% by mass to 50% by mass, and still more preferably 25% by mass to 40% by mass, from the viewpoint of the aggregating effect of a dispersion component such as a pigment and the thickening effect of the water-soluble polymer B.

Regarding the treatment liquid, the acidic compound may be used alone, or two or more thereof may be used in combination.

In a case where the treatment liquid contains an acidic compound as an aggregation component, the amount of the treatment liquid applied to the recording medium is not particularly limited as long as the treatment liquid is present in an amount sufficient to aggregate the ink composition. The amount of the treatment liquid applied to the recording medium is preferably 0.5 $g/m^2$ to 4.0 $g/m^2$ and more preferably 1.0 $g/m^2$ to 2.0 $g/m^2$ from the viewpoint of the aggregating action and thickening action in the ink composition. In particular, from the viewpoint of an action by the acidic compound, the amount of the treatment liquid to be applied is preferably an amount of the acidic compound of 0.5 $g/m^2$ to 4.0 $g/m^2$, and more preferably an amount of the acidic compound of 0.9 $g/m^2$ to 3.75 $g/m^2$.

—Polyvalent Metal Salt—

The treatment liquid also preferably contains a polyvalent metal salt as the aggregation component. The polyvalent metal salt is suitable for causing the rapid aggregating action.

Examples of the polyvalent metal salt include salts of the Group 2 alkaline earth metals in the Periodic Table (for example, magnesium and calcium), salts of the Group 3 transition metals in the Periodic Table (for example, lanthanum), salts of the Group 13 cations in the Periodic Table (for example, aluminum), and salts of lanthanides (for example, neodymium). As the salts of a metal, carboxylate (formate salt, acetate salt, benzoic acid, or the like), nitrate, chloride, and thiocyanate are suitable. Among them, preferred examples thereof include calcium salt or magnesium salt of a carboxylic acid (formic acid, acetic acid, benzoic acid, or the like), calcium salt or magnesium salt of nitric acid, calcium chloride, magnesium chloride, and calcium salt or magnesium salt of thiocyanic acid.

In a case where the treatment liquid contains a polyvalent metal salt as an aggregation component, a content of the polyvalent metal salt in the treatment liquid is preferably 1% by mass to 10% by mass, more preferably 1.5% by mass to 7% by mass, and still more preferably 2% by mass to 6% by mass, from the viewpoint of the aggregating effect of a dispersion component such as a pigment and the thickening effect of the water-soluble polymer B.

—Cationic Polymer—

Examples of the cationic polymer include a homopolymer of a cationic monomer having a primary, secondary, or tertiary amino group or a quaternary ammonium salt group as a cationic group, and a copolymer of a cationic monomer containing a primary, secondary, or tertiary amino group or a quaternary ammonium salt group and a non-cationic monomer, or a condensation polymer thereof. The cationic polymer may be used in the form of any one of a water-soluble polymer and water-dispersible latex particles.

Preferred examples of the cationic polymer can include poly(vinylpyridine) salt, polyalkylaminoethyl acrylate, polyalkylaminoethyl methacrylate, poly(vinylimidazole), polyethyleneimine, polybiguanide, polyguanide, polyallylamine and derivatives thereof, and the like.

A weight-average molecular weight of the cationic polymer, is preferably selected in a range of low molecular weight from the viewpoint of the viscosity of the treatment liquid.

In a case where the treatment liquid is applied to the recording medium by an ink jet method, the weight-average molecular weight of the cationic polymer is preferably in a range of 1,000 to 500,000, more preferably in a range of 1,500 to 200,000, and still more preferably in a range of 2,000 to 100,000. A weight-average molecular weight of 1000 or more is advantageous in terms of aggregation rate. A weight-average molecular weight of 500,000 or less is advantageous in terms of jetting reliability.

In a case where the treatment liquid contains the cationic polymer as an aggregation component, a content of the cationic polymer in the treatment liquid is preferably 1% by mass to 50% by mass, more preferably 2% by mass to 30% by mass, and still more preferably 2% by mass to 20% by mass, from the viewpoint of the aggregating effect of a dispersion component such as a pigment and the thickening effect of the water-soluble polymer B.

(Water)

The treatment liquid in the present disclosure contains water.

As the water, for example, ion exchange water or the like can be used.

A content of water is not particularly limited, but is preferably in a range of 10% by mass to 99% by mass, more preferably in a range of 30% by mass to 80% by mass, and still more preferably in a range of 40% by mass to 80% by mass with respect to a total mass of the treatment liquid.

(Other Component)

The treatment liquid in the present disclosure may contain components other than the above components. Examples of other components include an organic solvent, a nitrogen-containing heterocyclic compound, an antifoaming agent, other additives, and the like.

—Organic Solvent—

As the organic solvent, an organic solvent (hereinafter referred to as a water-soluble organic solvent) that is dissolved in 100 g of water at 20° C. in an amount of 5 g or more is preferable.

As the water-soluble organic solvent, the same water-soluble organic solvent that can be contained in the ink composition can be used. Among these, from the viewpoint of curl suppression, polyalkylene glycol or a derivative thereof is preferable, and at least one selected from the group consisting of diethylene glycol monoalkyl ether (such as diethylene glycol monobutyl ether), triethylene glycol monoalkyl ether, dipropylene glycol, tripropylene glycol monoalkyl ether (such as tripropylene glycol monomethyl ether), polyoxypropylene glyceryl ether, and polyoxyethylene polyoxypropylene glycol is more preferable.

A content of the organic solvent in the treatment liquid is not particularly limited, but is preferably 1% by mass to 30% by mass and more preferably 5% by mass to 15% by mass with respect to a total mass of the treatment liquid, from the viewpoint of curl suppression.

—Antifoaming Agent—

Examples of the antifoaming agent include a silicone-based compound (a silicone-based antifoaming agent), a pluronic-based compound (a pluronic-based antifoaming agent), and the like. Among these, a silicone-based antifoaming agent is preferable. As the silicone-based antifoaming agent, a silicone-based antifoaming agent containing a polysiloxane structure is preferable.

As the antifoaming agent, a commercially available product on the market may be used, and examples thereof include BYK-012, 017, 021, 022, 024, 025, 038, 094 (all of which are manufactured by BYK Japan KK.), KS-537, KS-604, KM-72F (all of which are manufactured by Shin-Etsu Chemical Co., Ltd.), TSA-739 (manufactured by Momentive Performance Materials Japan GK), OLFINE AF-104 (manufactured by Nissin Chemical co., ltd.), and the like. Among these, the silicone-based antifoaming agents, BYK-017, 021, 022, 024, 025, 094, KS-537, KS-604, KM-72F, and TSA-739, are preferable, and from the viewpoint of jetting stability of ink, BYK-024 is particularly preferable.

In a case where the treatment liquid contains the antifoaming agent, a content of the antifoaming agent is preferably 0.0001% by mass to 1% by mass and more preferably 0.001% by mass to 0.1% by mass with respect to a total mass of the treatment liquid. In a case where a silicone-based antifoaming agent is used as the antifoaming agent, the silicone-based antifoaming agent is preferably contained in a silicone oil equivalent amount of 50 ppm to 200 ppm.

~Physical Properties of Treatment Liquid~

1. Surface Tension

A surface tension of the treatment liquid is not particularly limited and may be, for example, 20 mN/m or more. From the viewpoint of coatability on a material subjected to recording, the surface tension is preferably 20 mN/m to 60 mN/m and more preferably 25 mN/m to 45 mN/m.

The surface tension of the treatment liquid uses the same measuring method as that of the ink composition.

The surface tension of the treatment liquid can be adjusted by, for example, adding a surfactant.

2. pH

The pH of the treatment liquid (25° C.±1° C.) is preferably in a range of 7.0 or less, more preferably 0.5 to 3.5, and still more preferably 0.5 to 2.0 from the viewpoint of the aggregation rate of the ink composition.

The pH is measured by the same measuring method as that of the ink composition.

3. Viscosity

The viscosity of the treatment liquid is preferably in a range of 1 mPa·s to 30 mPa·s, more preferably in a range of 1 mPa·s to 20 mPa·s, still more preferably in a range of 2 mPa·s to 15 mPa·s, and particularly preferably in a range of 2 mPa·s to 10 mPa·s from the viewpoint of the aggregation rate of the ink composition.

The viscosity is measured by the same measuring method as that of the ink composition.

The ink set of the present disclosure can be widely used for recording an image. Among various image recording method, an ink jet recording method of jetting an ink composition, in some cases a treatment liquid, from a jetting head by using an ink jet method to record an image can be suitably used.

<Image Recording Method> an image recording method of the present disclosure includes a step of applying a treatment agent of the ink set of the present disclosure described above on a recording medium (hereinafter, referred to as a treatment agent application step) and a step of applying the ink composition of the ink set of the present disclosure described above to a treatment liquid-applied surface of the recording medium to which the treatment agent has been applied to record an image (hereinafter, referred to as an ink applying step). The image recording method of the present disclosure may include other steps, as necessary, such as a step of drying an ink (hereinafter, referred to as an ink drying step) and a step of performing heat fixing (hereinafter, referred to as a heat fixing step).

Since the ink set of the present disclosure described above is used in the image recording method of the present disclosure, it is possible to record an image in which the occurrence of bleeding is suppressed, and cracks are less likely to occur.

—Ink Set—

Since the ink set in the image recording method of the present disclosure is as described in detail in the above described "Ink Set" section, the description thereof will not be repeated. Similarly, regarding the ink composition and the treatment liquid constituting the ink set, the descriptions thereof will not be repeated.

(Treatment Liquid Applying Step)

In the treatment liquid applying step, the treatment liquid of the ink set of the present disclosure described above is applied onto the recording medium.

The treatment liquid can be applied to the recording medium by a known liquid application method, and for example, it is possible to select any method such as a coating method, an ink jet method, or a dipping method.

Examples of the coating method include size press methods such as a spray coating method, a horizontal size press method, and a calender size press method; knife coat methods such as an air knife coat method; roll coat methods such as a gate roll coat method, a direct roll coat method, a reverse roll coat method, and a squeeze roll coat method; blade coat methods such as a bill blade coat method; bar coat methods such as a rod bar coat method; cast coat methods; gravure coat methods; curtain coat methods; die coat methods; brush coat methods; and the like.

In addition, a coating method in which the coating amount is controlled by using a coating device provided with a liquid amount restriction member, such as a coating device described in JP1998-230201A (JP-H10-230201A) may be applied.

Regarding a region to which the treatment liquid is applied, the treatment liquid may be applied to the entire surface of the recording medium such that it is provided to the entirety of the recording medium, or alternatively, may be partially applied such that it is provided to a region to which the ink has been provided in the ink applying step. From the viewpoint of uniformly adjusting the amount of the treatment liquid to be applied, uniformly recording fine lines or fine image portions, and suppressing bleeding such as uneven density in an image, it is preferable to apply the treatment liquid to the entire recording medium such that it is provided to the entirety of the recording medium by a roll coat method using a coating roller.

Examples of a method for applying the treatment liquid to the recording medium by controlling the amount of the treatment liquid to be applied include a method using an anilox roller. An anilox roller refers to a roller of which a surface is coated with ceramic by thermal spraying and processed with a laser such that a pyramidal shape, a diagonal line, a testudinal shape, or the like is formed thereon. The anilox roller can be used to transfer and apply the treatment liquid by allowing the treatment liquid to enter a recessed portion attached to the roller surface and coming into contact with the recording medium. In this case, a controlled amount of the treatment liquid can be applied according to the size of the recess of the anilox roller.

(Ink Applying Step)

In the ink applying step, the ink composition of the ink set of the present disclosure described above is applied to the treatment liquid-applied surface of the recording medium to which the treatment liquid is applied, thereby recording an image.

The method for applying the ink composition is not particularly limited as long as the ink composition can be applied onto the recording medium, and any aspect using a known method such as a coating method, a dipping method, or an ink jet method may be adopted. Among these, the ink jet method is suitable in that a film (for example, an image) can be formed on various recording media.

It is preferable to adopt an aspect in which the image is recorded by jetting the ink composition by an ink jet method.

The way of jetting the ink composition in the ink jet method is not particularly limited, and for example, any known methods such as an electric charge control method of jetting the ink composition using electrostatic attraction force, a drop-on-demand method (pressure pulse method) using vibration pressure of a piezoelectric element, an acoustic ink jet method of converting an electric signal into an acoustic beam, irradiating the ink with the acoustic beam, and jetting the ink composition by using radiation pressure, a thermal ink jet method (BUBBLE JET (registered trademark)) of heating the ink, forming bubbles, and using generated pressure, and the like may be used.

As the ink jet method, particularly, an ink jet method as a method described in JP1979-059936A (JP-S54-059936A), in which an ink composition subjected to an action of thermal energy undergoes a sudden volume change, and the ink composition is jetted from a nozzle by the action force due to this state change, can be effectively used.

As the ink jet method, a method described in paragraphs 0093 to 0105 of JP2003-306623A can also be applied.

The way of using the ink jet head also includes a shuttle method of performing recording while a short serial head is allowed to scan in the width direction of a medium subjected to recording, and a line method of using a line head in which recording elements are arranged correspondingly to the entire range of one side of a medium subjected to recording.

By the line method, an image can be recorded on the entire surface of the medium subjected to recording by the medium subjected to recording being scanned in a direction orthogonal to a direction in which the recording elements are arranged. In the line method, a transport system such as a carriage that allows the short head to perform scanning in the shuttle method is unnecessary. In addition, in the line method, as compared with the shuttle method, a carriage is not required to move, and a complicated scanning control with the medium subjected to recording is unnecessary, and only the medium subjected to recording moves. Therefore, according to the line method, an increase in the recording speed of an image is achieved as compared with the shuttle method.

The ink composition is preferably applied using an ink jet head having a resolution of 300 dpi or more (more preferably 600 dpi or more and still more preferably 800 dpi or more). Herein, dpi is an abbreviation for dot per inch, and 1 inch is 2.54 cm.

The amount of liquid droplets of the ink composition jetted from nozzles of the ink jet head is preferably 1 picoliter (pL) to 10 pL and more preferably 1.5 pL to 6 pL, from the viewpoint of obtaining a high-definition image.

In addition, from the viewpoint of suppressing unevenness of an image and improving a connection between continuous gradations, it is also effective to jet the ink composition by combining the different amount of liquid droplets.

—Recording Medium—

As the recording medium, printing paper mainly composed of cellulose (for example, high-quality paper, coated paper, art paper) can be used.

As the recording medium, a commercially available recording medium can be appropriately selected, and examples thereof include high-quality paper (A) such as "OK Prince High Quality" manufactured by Oji Paper Co., Ltd., "Shiraoi" manufactured by Nippon Paper Industries Co., Ltd., and "New NPI high-quality" manufactured by Nippon Paper Industries Co., Ltd.; high-quality coated paper such as "Silver diamond" manufactured by Nippon Paper Industries Co., Ltd.; lightly coated paper such as "OK Everlight Coat" manufactured by Oji Paper Co., Ltd. and "Aurora S" manufactured by Nippon Paper Industries Co., Ltd.; lightweight coated paper (A3) such as "OK Coat L" manufactured by Oji Paper Co., Ltd. and "Aurora L" manufactured by Nippon Paper Industries Co., Ltd.; coated paper (A2, B2) such as "OK Top Coat+" manufactured by Oji Paper Co., Ltd. and "Aurora Coat" manufactured by Nippon Paper Industries Co., Ltd.; art paper (A1) such as "OK Kanto+" manufactured by Oji Paper Co., Ltd. and "Tokubishi Art" manufactured by Mitsubishi Paper Mills Limited; and the like. It is also possible to use various pieces of photographic paper for ink jet recording.

Among the recording media, so-called coated paper used for general offset printing and the like is preferable. The coated paper is provided with a coating layer obtained by applying a coating material to a surface of high-quality paper, alkaline paper, or the like, which is mainly composed of cellulose and is not generally surface-treated. Among these, coated paper containing a base paper and a coating layer containing kaolin and/or heavy calcium bicarbonate is preferable, and art paper, coated paper, and lightweight coated paper or lightly coated paper are more preferable.

From the viewpoint that the recording medium can be expected to have the effect of suppressing the movement of a coloring material, and a satisfactory high-quality image with better color density and hue than that of the related art is obtained, a water absorption coefficient Ka is preferably 0.05 mL/m$^2$·ms$^{1/2}$ to 0.5 mL/m$^2$·ms$^{1/2}$, more preferably 0.1 mL/m$^2$·ms$^{1/2}$ to 0.4 mL/m$^2$·ms$^{1/2}$, and still more preferably 0.2 mL/m$^2$·ms$^{1/2}$ to 0.3 mL/m$^2$·ms$^{1/2}$.

The water absorption coefficient Ka is synonymous with that described in JAPAN TAPPI Pulp and Paper Test Method No. 51: 2000 (Published by Japan Technical Association of the Pulp and Paper). The absorption coefficient Ka is a value calculated from the difference in the amount of water transferred between a contact time of 100 ms and a contact time of 900 ms using an automatic scanning liquid absorption meter KM500Win (manufactured by KUMAGAI RIKI KOGYO Co., Ltd.).

[Other Steps]

The image recording method of the present disclosure can include an Ink drying step, a heat fixing step, an ink removing step, and the like, as necessary.

(a) Ink Drying Step

After applying the ink composition, the applied ink composition may be heated and dried.

Examples of means for performing heating and drying include known heating means such as a heater, known blowing means such as a dryer, and means combining these.

Examples of a heating and drying method include a method for applying heat with a heater or the like to an opposite side to a surface of the recording medium to which the ink composition is applied, a method for applying hot air or heated air to a surface of the recording medium to which the ink composition is applied, a method for applying heat with an infrared heater to a surface to which the ink composition is applied or to an opposite side to the surface of the recording medium to which the ink composition is applied, and a method obtained by combining a plurality of these, and the like.

The heating temperature during heating and drying is preferably 55° C. or higher, more preferably 60° C. or higher, and particularly preferably 65° C. or higher. The upper limit of the heating temperature is not particularly limited, but for example, the upper limit can be 150° C. and is preferably 130° C.

The time for heating and drying the ink composition is not particularly limited, but is preferably 3 seconds to 60 seconds, more preferably 5 seconds to 60 seconds, and still more preferably 10 seconds to 30 seconds.

The recording medium may be heated in advance before the ink composition is applied.

The heating temperature may be appropriately set, but the temperature of the recording medium is preferably 20° C. to 50° C., and more preferably 25° C. to 40° C.

(b) Heat Fixing Step

As necessary, the heat fixing step may be carried out after the Ink drying step.

The image is fixed on the recording medium by application of a heat fixing treatment, and the resistance of the image to abrasion can be further enhanced. As the heat fixing step, for example, a heat fixing step described in paragraphs 0112 to 0120 of JP2010-221415A can be applied.

(c) Ink Removing Step

In the ink removing step, as necessary, the ink composition (for example, an ink solid adhered by drying) adhered to the jetting head used for ink jet recording is removed by a maintenance liquid. Regarding the details of the maintenance liquid and the ink removing step, the maintenance liquid and the ink removing step described in WO2013/180074A can be applied.

EXAMPLES

Hereinafter, Examples of the present invention will be described in more detail. The present disclosure is not limited to the following Examples unless departing from the gist.

(Preparation of Pigment Dispersion 1)

—Preparation of Polymer Dispersing Agent A-1 (Pigment Dispersion Polymer A—

44 g of methyl ethyl ketone was added to a 500 ml three-neck flask equipped with a stirrer and a cooling tube, the mixture was heated to 72° C. under a nitrogen atmosphere, and a solution obtained by dissolving 0.43 g of dimethyl 2,2'-azobisisobutyrate, 35 g of benzyl methacrylate (BzMA), 5 g of methacrylic acid (MAA), and 10 g of methyl methacrylate (MMA) in 25 g of methyl ethyl ketone is added dropwise thereto for 3 hours. After completion of the dropwise addition, a reaction was further carried out for 1 hour, a solution obtained by dissolving 0.21 g of dimethyl 2,2'-azobisisobutyrate in 1 g of methyl ethyl ketone was added, the temperature of the mixture was raised to 78° C., and the mixture was heated for 4 hours. The obtained reaction solution was reprecipitated twice in a large excess amount of hexane, and a precipitated resin was dried to obtain 43 g of a polymer dispersing agent A-1.

A composition of the obtained polymer dispersing agent A-1 was confirmed by the nuclear magnetic resonance method ('H-NMR). The polymer dispersing agent A-1 contained a carboxy group as an acid group in the molecule, and an acid value was 65.4 mgKOH/g. A C log P value of the polymer dispersing agent A-1 was 1.89.

A weight-average molecular weight (Mw) of the polymer dispersing agent A-1 was 42,000.

As described above, the C log P value of the polymer dispersing agent A-1 was obtained by calculating a C log P value of a monomer that is a copolymerization component of the polymer, multiplying the value by a mass ratio, and totaling the values.

The acid value of the polymer dispersing agent A-1 was determined by a method described in Japanese Industrial Standards (JIS) K0070:1992.

The weight-average molecular weight (Mw) of the polymer dispersing agent A-1 was measured by GPC.

That is, HLC-8220GPC (manufactured by TOSOH CORPORATION) was used as the GPC, three columns, TSKgeL Super HZ2000, TSKgeL Super HZ4000, and TSKgeL Super HZ-H (all manufactured by TOSOH CORPORATION, 4.6 mm×15 cm) were connected in series, and NMP (N-methylpyrrolidone) was used as an eluent. A sample concentration was 0.3% by mass, a flow rate was 0.35 ml/min, a sample injection volume was 10 μl, a measurement temperature was 40° C., and an IR detector was used as a detector. The calibration curve is prepared using 6 samples of "F-80", "F-20", "F-4", "F-2", "A-5000", and "A-1000", which are "Standard Samples TSK standard, polystyrene" manufactured by TOSOH CORPORATION.

—Preparation of Cyan Pigment Dispersion 1—

10 parts of Pigment Blue 15:3 (phthalocyanine blue A220, manufactured by Dainichiseika Color&Chemicals Mfg. Co., Ltd.), 5 parts of the polymer dispersing agent A-1, 42 parts of methyl ethyl ketone, and 5.5 parts of a 1 mol/L sodium hydroxide (NaOH) aqueous solution, and 87.2 parts of ion exchange water were mixed. The mixed solution was dispersed by a beads mill using 0.1 mmφ zirconia beads for 2 to 6 hours. Methyl ethyl ketone was removed from the obtained dispersion at 55° C. under reduced pressure, and a part of water was further removed to obtain a cyan pigment dispersion 1 having a pigment concentration of 10.2% by mass.

The cyan pigment dispersion 1 contains a polymer-coated pigment containing a pigment and a polymer dispersing agent A-1 adhering to a part or all of the surface of the pigment.

(Preparation of Pigment Dispersion 2)

—Preparation of Polymer Dispersing Agent A-2 (Pigment Dispersion Polymer A Containing Crosslinking Structure)—

A monomer composition was prepared by mixing 172 g of methacrylic acid (MAA), 828 g of benzyl methacrylate (BzMA), and 375 g of isopropanol.

Separately from the above, an initiator composition was prepared by mixing 22.05 g of 2,2-azobis(2-methylbutyronitrile) and 187.5 g of isopropanol.

Next, 187.5 g of isopropanol was heated to 80° C. under a nitrogen atmosphere, and a mixture of the above described monomer composition and the above described initiator composition was added dropwise thereto for 2 hours. After completion of the dropwise addition, the obtained solution was kept at 80° C. for another 4 hours and then cooled to 25° C. After cooling, a solvent was removed under reduced pressure to obtain a polymer dispersing agent A-2 (BzMA: MAA=82.8:17.2 [mass ratio]).

A composition of the obtained polymer dispersing agent A-2 was confirmed by $^1$H-NMR. The polymer dispersing agent A-2 contained a carboxy group as an acid group in the molecule, and an acid value was 112 mgKOH/g. A C log P value of the polymer dispersing agent A-2 was 1.79. A Mw of the polymer dispersing agent A-2 was 30,000.

The acid value, C log P value, and Mw were measured by the same method as described above.

—Preparation of Cyan Pigment Dispersion 2—

0.8 equivalent of the amount of methacrylic acid in the polymer dispersing agent A-2 (150 g) obtained as described above was neutralized with an aqueous potassium hydroxide solution. After neutralization, ion exchange water was further added so that a concentration of the polymer dispersing agent A-2 was 25% by mass to prepare the polymer dispersing agent A-2, thereby obtaining an aqueous solution of the polymer dispersing agent A-2.

124 parts of an aqueous solution of the polymer dispersing agent A-2, 48 g of Pigment Blue 15:3 (phthalocyanine blue A220, manufactured by Dainichiseika Color&Chemicals Mfg. Co., Ltd.), 75 g of water, and 30 g of dipropylene glycol were mixed. The mixed solution was dispersed by a beads mill using zirconia beads (bead diameter 0.1 mmφ) until a desired volume average particle diameter was obtained, thereby obtaining a dispersion (uncrosslinked dispersion) having a pigment concentration of 15% by mass.

Next, 1.3 g of Denacol EX-321 (crosslinking agent; manufactured by Nagase ChemteX Corporation) and 14.3 g of an aqueous boric acid solution (boric acid concentration: 4% by mass) were added to 136 g of the above uncrosslinked dispersion. After reacting at 50° C. for 6 and a half hours, the mixture was cooled to 25° C. to obtain a crosslinked dispersion.

Next, ion exchange water is added to the above crosslinked dispersion, and ultrafiltration was carried out using a stirring type ultra holder (manufactured by Advantec Toyo Kaisha, Ltd.) and an ultrafiltration filter (manufactured by Advantec Toyo Kaisha, Ltd., molecular weight cut-off 50,000, Q0500076E ultrafilter).

Next, the crosslinked dispersion was purified so that a concentration of dipropylene glycol in the crosslinked dispersion was 0.1% by mass or less. Then, the cyan pigment dispersion 2 was obtained by concentration until the pigment concentration was 15% by mass.

The cyan pigment dispersion 2 contains a polymer-coated pigment containing a pigment and a polymer dispersing agent A-2 adhering to a part or all of the surface of the pigment. In a case of containing the polymer-coated pigment, the polymer dispersing agent A-2 is crosslinked by a crosslinking agent.

(Preparation of Pigment Dispersion 3)

—Preparation of Polymer Dispersing Agent A-3 (Pigment Dispersion Polymer A)—

In the preparation of the solution of the polymer A-1, a solution of the polymer A-3 (C18MA:St:AA=20:60:20 [mass ratio]) was prepared in the same manner as in the preparation of the solution of the polymer A-1, except that types and amounts of the acid group and monomer used in the preparation were changed as shown in Table 2 below.

C18MA: Stearyl Methacrylate

A composition of the obtained polymer dispersing agent A-3 was confirmed by $^1$H-NMR. The polymer dispersing agent A-3 contained a carboxy group as an acid group in the molecule, an acid value was 156 mgKOH/g, and a C log P value of the polymer dispersing agent A-3 was 2.99. A Mw of the polymer dispersing agent A-3 was 50,000.

The acid value, C log P value, and Mw were measured by the same method as that for the polymer dispersing agent A-1.

—Preparation of Cyan Pigment Dispersion 3—

In the preparation of the cyan pigment dispersion 1, a cyan pigment dispersion 3 was prepared in the same manner as in the preparation of the cyan pigment dispersion 1, except that the polymer dispersing agent A-1 was replaced with the same amount of the polymer dispersing agent A-3.

(Preparation of Water-soluble Polymer B)

—Preparation of Polymer B-1—

A 500 mL three-neck flask equipped with a stirrer, a thermometer, a reflux condenser, and a nitrogen gas introduction tube was charged with propylene glycol (35 g) and heated to 90° C. under a nitrogen stream. A mixed solution obtained by mixing 5.55 g of V-601 (radical polymerization initiator; manufactured by FUJIFILM Wako Pure Chemical Corporation), 9.21 g of methacrylic acid (MAA), 40.79 g of methyl methacrylate (MMA), 30 g of isobornyl methacrylate (IBOMA; a constitutional unit represented by General Formula (B)), 20 g of 2-hydroxyethyl methacrylate (HEMA; a constitutional unit represented by General Formula (1)), 1.63 g of dodecyl mercaptan, and 65.00 g of propylene glycol was added dropwise at a constant rate under a dropwise addition condition in which the dropwise addition was completed in 2 hours. After completion of the dropwise addition of the mixed solution, a mixture was stirred for 1 hour. Subsequently, a mixed solution obtained by mixing 1.85 g of V-601 and 24.62 g of propylene glycol was added to the obtained reaction mixture, and the mixture was further stirred for 1.5 hours. After adding 120.21 g of propylene glycol to the obtained reaction mixture, 8.56 g of a 50% by mass sodium hydroxide aqueous solution (alkali metal hydroxide) was added dropwise by using a dropping funnel to obtain a solution of a polymer B-1.

A composition of the obtained solution of the polymer B-1 was confirmed by $^1$H-NMR, and a solid content concentration of the solution of the polymer B-1 was 30.1% by mass.

The polymer B-1 contained a carboxy group as an acid group in the molecule, and an acid value was 60 mgKOH/g. The polymer B-1 had a C log P value of 1.69, a weight-average molecular weight (Mw) of 15,000, and a glass transition temperature (Tg) of 127° C.

The measurement of the acid value and Mw, and the calculation of the C log P value were carried out by the same method as that for the polymer dispersing agent A-1.

The Tg of the polymer B-1 was measured by the following method.

A sample (that is, the polymer B-1) obtained by drying the solution of the polymer B-1 at 150° C. under reduced pressure for 6 hours was prepared and measured at a heating rate of 10° C./min using a differential scanning calorimeter (DSC) DSC7000X manufactured by Hitachi High-Tech Science Corporation.

Next, it was confirmed that the polymer B-1 was a water-soluble polymer, by the following method (see the "Property" column in Table 1).

First, 1 g of a sample (that is, a polymer) obtained by drying a solution of a polymer at 150° C. for 6 hours under reduced pressure is prepared. 100 g of water at 25° C. is added to 1 g of the prepared polymer, and the mixture is heated under reflux for 30 minutes. The temperature of the obtained liquid is lowered to 25° C., and the mixture is left to stand at 25° C. for 1 hour. By visually observing the liquid that has been left to stand, it is determined that the polymer is a "water-soluble polymer" in a case where the entire polymer is dissolved, and the polymer is a "water-insoluble polymer" in a case where a part or the entire polymer is not dissolved.

—Preparation of Polymers B-2 to B-11, B-13 to B-26, and CB-2 and CB-3—

In the preparation of the solution of the polymer B-1, solutions of the polymers B-2 to B-11, B-13 to B-26, and CB-2 and CB-3 were prepared in the same manner as in the preparation of the solution of the polymer B-1, except that types and amounts of the acid group and monomer used in the preparation were changed as shown in Tables 1 to 3 below.

The acid value, C log P value, Mw, and Tg were measured by the same method as that for the polymer B-1.

A property of the polymer (that is, whether the polymer was water-soluble or water-insoluble) was also confirmed by the same method as that for the polymer B-1.

—Preparation of Aqueous Dispersion of Self-dispersing Polymer CB-1—

A comparative self-dispersing polymer CB-1 was prepared as follows. 360.0 g of methyl ethyl ketone was put into a 2 L three-neck flask provided with a stirrer, a thermometer, a reflux condencer, and a nitrogen gas introduction tube, and then heated to 75° C. While the temperature inside a reaction container was maintained at 75° C., a mixed solution consisting of 36.0 g of dicyclopentanyl methacrylate, 306.0 g of methyl methacrylate, 18.0 g of methacrylic acid, 72 g of methyl ethyl ketone, and 1.44 g of "V-601" (radical polymerization initiator; manufactured by FUJIFILM Wako Pure Chemical Corporation) was added dropwise at a constant rate such that the dropwise addition was completed in 2 hours. After the dropwise addition was completed, a solution consisting of 0.72 g of "V-601" and 36.0 g of methyl ethyl ketone was added thereto and stirred at 75° C. for 2 hours, a solution consisting of 0.72 g of "V-601" and 36.0 g of methyl ethyl ketone was then added thereto and stirred at 75° C. for 2 hours, and the solution was heated to 85° C. and continually stirred for another 2 hours. Next, 668.3 g of the polymerization solution was weighed, 388.3 g of isopropanol and 122.1 ml of a 1 mol/L NaOH aqueous solution were added thereto, and the temperature inside the reaction container was raised to 80° C. Next, 720.1 g of distilled water was added dropwise at a rate of 20 ml/min to disperse the water. Then, a solvent was distilled off by keeping the temperature inside the reaction container at 80° C. for 2 hours, 85° C. for 2 hours, and 90° C. for 2 hours under atmospheric pressure. Thereafter, the pressure inside the reaction container was further reduced, and a total amount of 913.7 g of isopropanol, methyl ethyl ketone, and distilled water were distilled off, thereby obtaining an aqueous dispersion of a self-dispersing polymer CB-1 (emulsion) having a concentration of solid contents of 28.0% by mass.

The obtained aqueous dispersion of the self-dispersing polymer CB-1 had a pH of 8.4, a volume average particle diameter of 80 nm, a weight-average molecular weight (Mw) of 50,000, and a Tg of 116° C.

A pH was measured at 25° C. by adjusting the temperature of the aqueous dispersion of the self-dispersing polymer CB-1 to 25° C. and using a pH meter WM-50EG (manufactured by DKK-TOA CORPORATION). A volume average particle diameter of the self-dispersing polymer CB-1 was measured using Microtrac UPA EX-150 (manufactured by Nikkiso Co., Ltd.).

The Mw and Tg of the self-dispersing polymer CB-1 were measured by the same method as that for the polymer B-1.

As a result of confirming a property of the self-dispersing polymer CB-1 (that is, whether the polymer CB-1 is water-soluble or water-insoluble) by the same method as that for the polymer B-1, the self-dispersing polymer CB-1 was water-insoluble. That is, the self-dispersing polymer CB-1 is a water-insoluble polymer that is a comparative polymer.

Example 1

—Preparation of Cyan Ink C-1—

By using the cyan pigment dispersion 1 containing the polymer dispersing agent A-1 that is the pigment dispersion polymer A and the polymer B-2 that is the water-soluble polymer B, and various components are mixed to have the following composition, thereby preparing a mixed solution. After the preparation of the mixed solution, coarse particles were removed from the mixed solution with a 5 nm filter to prepare a cyan ink C-1 as the ink composition.

The cyan ink C-1 had a viscosity of 4.1 mPa·s (25° C.), a surface tension was 38.4 mN/m (25° C.), and a pH was 8.9 (25° C.).

| <Composition of Cyan Ink C-1> | |
|---|---|
| Cyan pigment (Pigment Blue 15:3, manufactured by Dainichiseika Color&Chemicals Mfg. Co., Ltd.) | 3% by mass |
| The above polymer dispersing agent A-1 (pigment dispersion polymer A) | 2% by mass |
| Polymer B-2 (water-soluble polymer B) | 2% by mass (in terms of solid content) |
| Propylene glycol (PG; manufactured by FUJIFILM Wako Pure Chemical Corporation) | 27% by mass |
| Glycerin | 2.5% by mass |
| OLFINE E1010 (manufactured by Nissin Chemical co., ltd., nonionic surfactant) | 1.25% by mass |
| Ion exchange water | in an amount of total 100% by mass |

—Preparation of Acid Treatment Liquid 1—

Each component in the following composition was mixed to obtain an acid treatment liquid (treatment liquid) 1.

The acid treatment liquid 1 thus obtained had a viscosity of 4.5 mPa·s (25° C.), a surface tension of 41.0 mN/m (25° C.), and pH of 0.1 (25° C.).

Each of the viscosity, surface tension, and pH was measured using a VISCOMETER TV-22 (manufactured by Toki Sangyo Co., Ltd.), an Automatic Surface Tensiometer CBVP-Z (manufactured by Kyowa Interface Science Co., Ltd.), and a pH meter WM-50EG (manufactured by DKK-Toa Corporation).

| <Composition of Acid Treatment Liquid 1> | |
|---|---|
| TPGmME (tripropylene glycol monomethyl ether) | 4.8% by mass |
| DEGmBE (diethylene glycol monobutyl ether) | 4.8% by mass |
| Malonic acid (acidic compound) | 16.0% by mass |
| Malic acid (acidic compound) | 7.8% by mass |
| Propane tricarboxylic acid (acidic compound) | 3.5% by mass |
| Phosphoric acid 85% by mass aqueous solution (acidic compound) | 15.0% by mass |
| Antifoaming agent (TSA-739 (15% by mass), manufactured by Momentive Performance Materials Japan GK; emulsion type silicone antifoaming agent) | 0.07% by mass in terms of silicone oil |
| Ion exchange water | in an amount of total 100% by mass |

—Image Recording—

As a recording medium, an OK top coat (manufactured by Oji Paper Co., Ltd.) was fixed on a stage operating at 500 mm/sec, and the acid treatment liquid 1 was applied on the fixed recording medium with a wire bar coater at about 1.7 g/m², and immediately after that, the recording medium was dried at 50° C. for 2 seconds. Thereafter, a line head (printer head GELJET GX5000 manufactured by Ricoh Co., Ltd.) arranged at an angle with respect to a moving direction of the recording medium was used to jet the cyan ink C-1 to a treatment liquid-applied surface of the recording medium under conditions of a resolution of 1,200×1,200 dots per inch (dpi), the jetting amount of 2.4 picolitre (pL), and a stage speed of 635 mm/sec, and a cyan solid image having a size of 20 mm×100 mm was recorded. Immediately after recording, the recording medium is placed on a hot plate at 60° C. in contact with a surface opposite to the image recording surface of the recording medium, and hot air at 120° C. is blown onto the image recording surface for 10 seconds using a dryer to be dried.

Examples 2, 4 to 22, 25 to 33 and Comparative Examples 1, 2, 4

In Example 1, a cyan ink was prepared, and image recording was carried out in the same manner as in Example 1, except that the composition in the preparation of the cyan ink C-1 was changed as shown in Tables 1 to 3.

Example 3

In Example 1, a cyan ink was prepared, and image recording was carried out in the same manner as in Example 1, except that the polymer B-2 (water-soluble polymer B) used for the preparation of the cyan ink C-1 was replaced with a polymer B-4, and the acid treatment liquid 1 was replaced with the following treatment liquid 2.

—Preparation of Treatment Liquid 2—

In the preparation of the treatment liquid 1, a treatment liquid 2 using a polyvalent metal salt was prepared in the same manner as the preparation of the treatment liquid 1, except that the acidic compound used for the preparation was changed to calcium acetate (solid content 5.0% by mass).

Examples 23 and 24

In Example 1, a cyan ink was prepared, and image recording was carried out in the same manner as in Example 1, except that the cyan pigment dispersion 1 used for the preparation of the cyan ink C-1 was replaced with the cyan pigment dispersion 3 using the polymer dispersing agent A-3 or the cyan pigment dispersion 2 using the polymer dispersing agent A-2, respectively.

Comparative Example 3

In Example 1, a cyan ink was prepared, and image recording was carried out in the same manner as in Example 1 without using the acid treatment liquid, except that the polymer B-2 (water-soluble polymer B) used for the preparation of the cyan ink C-1 was changed as shown in Table 3.

(Measurement and Evaluation)

The following measurements and evaluations were carried out for each of Examples and Comparative Examples. The results of measurements and evaluations are shown in Table 4.

—1. Bleeding—

The recording medium on which the image was recorded was visually observed, a state of the occurrence of bleeding was evaluated, and a degree of landing interference between ink droplets in the image was used as an index for evaluation.

A degree of the occurrence of landing interference in a case where the treatment liquid acted in the ink composition varies depending on a rate at which the water-soluble polymer in the ink composition precipitates and thickens (so-called aggregation rate). Therefore, in a case where the aggregation rate during the image recording is insufficient (that is, a case where the aggregation property is low), the adjacent ink droplets interfere with each other, and the landed ink droplets move. As a result, failure (bleeding) in which line thicknesses were uneven in a case where fine lines were recorded occurs. By using this phenomenon, the degree of landing interference of the ink composition was evaluated by evaluating a state of bleeding.

Specifically, the evaluation was carried out as follows.

A commercially available ink jet printer (DMP-2831 manufactured by FUJIFILM Dimatix, Inc.) was prepared as an ink jet recording device, and each of the obtained ink compositions was loaded into the ink jet printer. Then, fine lines each of which has a width of 2 dots were recorded with a length of 5 cm on a substrate made of polyvinyl chloride heated at 40° C. (manufactured by Avery Dennison, AVERY 400 GLOSS WHITE PERMANENT). After the jetting was stopped, the bleeding of the obtained fine lines was visually observed, and the bleeding was evaluated. The evaluation of bleeding was performed on the recorded fine lines based on the following evaluation standard, and the evaluation standard A, B, and C were set as practically acceptable ranges.

<Evaluation Standard>
- A: There is almost no bleeding, and a thickness of each fine line is uniform.
- B: There is slight bleeding, but a thickness of each fine line is uniform.
- C: There is bleeding and a part of fine lines is thick, but there is no problem in practical use.
- D: A state in which bleeding is remarkable and fine lines become thicker, which causes practical problems.

—2. Image Cracking—

In the above described "image recording", a cyan solid image having a size of 20 mm×100 mm was recorded by the same method as the above described "image recording", except that the jetting amount of the jetting condition is changed from 2.4 pL to 3.5 pL. The recorded solid image was visually observed to confirm the presence or absence of a part (cracking of the image) in which cyan ink was not present in the solid image (region of ink film), and the white background of the recording medium appears to be exposed, and the evaluation was carried out according to the following evaluation standard.

<Evaluation Standard>
- A: No white background can be observed in the solid image.
- B: The white background is observed to be streaky in a part of the solid image, and the area of the white background is less than 2% of the area of the solid image.
- C: The white background is observed to be streaky in the entire solid image, and the area of the white background is 2% or more and less than 10% with respect to the area of the solid image.
- D: The white background is observed to be streaky in the entire solid image, and the area of the white background is 10% or more with respect to the area of the solid image.

—3. Head Maintainability—

10 μL of cyan ink was added dropwise on a slide glass to form a cyan ink film, and the ink film was left to stand at a temperature of 25° C. under atmospheric pressure, and dried. 1 mL of water was added dropwise onto the dried ink film (ink solid), and the ink film was left to stand at a temperature of 25° C. for 10 minutes. Then, the solubility and dispersibility of the ink solid in water were evaluated based on the following evaluation standard. The evaluation was carried out with the evaluation standard A, B, and C as practically acceptable ranges.

A value of "%" in the evaluation standard is based on an area. That is, the value of "%" is a proportion of an area of the ink solid remaining on the slide glass in a case where the area of the ink solid existing region before water dropwise addition (a projected area of the slide glass in a direction perpendicular to a surface on which the ink was added dropwise) is 100%.

<Evaluation Standard>
- A: The ink solid is completely dissolved or dispersed in water, and no undissolved residue was confirmed on the slide glass.
- B: The ink solid remains on the slide glass, but the amount of the residue is less than 30% of the ink solid before water dropwise addition.
- C: The ink solid remains on the slide glass, but the amount of the residue is 30% or more and less than 60% of the ink solid before water dropwise addition.
- D: The ink solid remains on the slide glass, and the amount of the residue is 60% or more of the ink solid before water dropwise addition.

—4. Jettability (Inclined Jetting)—

A line image of 75×2400 dpi was recorded by jetting cyan ink under the following ink application conditions without applying the treatment liquid on the recording medium ("Picture (registered trademark) Photo Finishing Pro", manufactured by FUJIFILM Corporation), and was dried. The center value of the lines using the dot analyzer DA-6000 (trade name, manufactured by Oji Measuring Instruments Co., Ltd.) was measured with respect to the dried line image to obtain a distance (deviation amount) from the center value of the line image, thereby calculating a standard deviation ($\sigma$). The jettability (inclined jetting) was evaluated based on the following evaluation standard using the calculated value of $\sigma$ as an index. The evaluation was carried out with the evaluation standard A, B, and C as practically acceptable ranges.

~Ink Application Conditions~

Head: Using 1,200 dot per inch (dpi)/20 inch width piezo full line head

Amount of Jetted liquid droplets: 2.4 pL

Drive frequency: 12 kHz (transportation speed of recording medium 500 mm/sec)

<Evaluation Standard>
- A: $\sigma < 4$ μm
- B: $4\ \mu m \leq \sigma < 6$ μm
- C: $6\ \mu m \leq \sigma \leq 10$ μm
- D: $\sigma > 10$ μm —5. Film Quality (Blocking Resistance)—

As a recording medium, Tokubishi Art Double Sided N (manufactured by Mitsubishi Paper Mills Limited) was fixed on a stage operating at 500 mm/sec, and the treatment liquid is applied on the fixed recording medium with a wire bar coater at about 1.7 g/m², and immediately after that, the recording medium was dried at 50° C. for 2 seconds. Thereafter, a line head (printer head GELJET GX5000 manufactured by Ricoh Co., Ltd.) arranged at an angle with respect to a moving direction of the recording medium was used to jet the cyan ink C-1 to a treatment liquid-applied surface of the recording medium under conditions of a resolution of 1200×1200 dpi and the jetting amount of 3.5 pL, and a cyan solid image having a size of 20 mm×100 mm was recorded. Immediately after recording, the recording medium is placed on a hot plate at 60° C. in contact with a surface opposite to the image recording surface of the recording medium, and hot air at 120° C. is blown onto the image recording surface for 10 seconds using a dryer to be dried, and the result was adopted as an image sample.

The image sample was cut into two pieces to obtain sample pieces each of which has a size of 3 cm square.

Next, the two sample pieces were arranged so that the image recording surfaces faced each other, and the four corners were aligned and overlapped. This was placed on a hot plate at 50° C. under environmental conditions of 60° C. and 50% RH. A 25 mm×25 mm×3 mm flat rubber plate was placed over the two sample pieces (that is, the surface of the recording medium) that are placed in an overlapped state so that the 2.5 cm×2.5 cm surface is in contact with the recording medium. Furthermore, a flat plate-shaped plastic plate having a size of 25 mm×25 mm×3 mm was placed on the rubber plate so that the surface of 2.5 cm×2.5 cm was in contact with the rubber plate. Next, a container containing 300 g of beads was placed on the plastic plate and left to stand for 20 minutes. Then, the two overlapped sample pieces were peeled off and evaluated based on the following evaluation standard. The evaluation was carried out with the evaluation standard A, B, and C as practically acceptable ranges.

<Evaluation Standard>
A: the sample pieces peel off naturally, or there was resistance during the peeling off, but no color transfer of the sample pieces was observed.
B: Color transfer of the sample pieces was observed in a range of less than 10% of the area of the solid image portion, but this is a range that does not hinder practical use.
C: Color transfer of the sample pieces is observed in a range of 10% or more and less than 20% of the area of the solid image portion, which is a range that does not hinder practical use.
D: Color transfer of the sample pieces is observed in a range of 20% or more of the area of the solid image portion, which is a range that causes a practical problem.

TABLE 1

| | Pigment dispersion polymer A | | | | Water-soluble polymer B | | | | | | | |
|---|---|---|---|---|---|---|---|---|---|---|---|---|
| | Monomer type | Mw | ClogP | Liberated amount [% by mass] | | Monomer type (Numerical value in parenthesis is mass ratio) | | | Acid value [mgKOH/g] | Property | Mw | ClogP | Tg [° C.] |
| Example 1 | A-1: BzMA/ MMA/ MAA | 42k | 1.89 | 0.40% | B-2 | AMPS (15) | HEMA (20) | IBOMA (30) | MMA (35) | 40.6 | Water soluble | 15k | 1.30 | 114 |
| Example 2 | | | | 0.40% | B-3 | P-1M (15) | | | | 40.1 | Water soluble | 15k | 1.80 | 110 |
| Example 3 | | | | 0.40% | B-4 | MAA (40) | HEMA (3) | | MMA (27) | 260.7 | Water soluble | 15k | 0.42 | 167 |
| Example 4 | | | | 0.40% | B-1 | MAA (9) | HEMA (20) | | MMA (41) | 60 | Water soluble | 15k | 1.69 | 127 |
| Example 5 | | | | 0.40% | B-5 | MAA (15) | HEMA (65) | — | MMA (20) | 97.8 | Water soluble | 15k | −0.10 | 105 |
| Example 6 | | | | 0.40% | B-6 | MAA (40) | HEMA (3) | IBOMA (30) | MMA (27) | 260.7 | Water soluble | 100k | 0.42 | 167 |
| Example 7 | | | | 0.40% | B-7 | | | | | 260.7 | Water soluble | 50k | 0.42 | 167 |
| Example 8 | | | | 0.40% | B-8 | MAA (15) | | | MMA (52) | 97.8 | Water soluble | 15k | 1.56 | 137 |
| Example 9 | | | | 0.40% | B-9 | MAA (40) | | | MMA (27) | 260.7 | Water soluble | 15k | 0.42 | 167 |
| Example 10 | | | | 0.40% | B-10 | MAA (15) | | | MMA (52) | 97.8 | Water soluble | 15k | 1.56 | 137 |
| Example 11 | | | | 0.40% | B-11 | | | | | 97.8 | Water soluble | 15k | 1.56 | 137 |
| Example 12 | | | | 0.40% | B-4 | MAA (40) | | | MMA (27) | 260.7 | Water soluble | 15k | 0.42 | 167 |
| Example 13 | | | | 0.40% | B-13 | | PME 1000 (3) | | | 260.7 | Water soluble | 15k | −0.33 | 157 |
| Example 14 | | | | 0.40% | B-14 | | EOEOEA (3) | | | 260.7 | Water soluble | 15k | 0.42 | 157 |

TABLE 1-continued

| | | Water-soluble polymer B | | | | | | Solvent [content] | | | | Treatment liquid | |
|---|---|---|---|---|---|---|---|---|---|---|---|---|---|
| | | Neutral-ization degree [% by mol] | Base for neutral-ization | Con-tent [% by mass] | Total amount of acid group and Formula (1) | Liberated amount [% by mass] | Ratio $D^B/D^A$ of liberated polymer | First solvent [% by mass] | Second solvent [% by mass] | Total amount [% by mass] | Content mass ratio | Type | Aggregation component |
| Example 1 | | 100% | NaOH | 2.0% | 35.0% | 2.0% | 5.0 | PG 27% | Glycerin 2.5% | 29.5% | 0.1 | 1 | Acid |
| Example 2 | | 100% | NaOH | 2.0% | 35.0% | 2.0% | 5.0 | | | | | 1 | Acid |
| Example 3 | | 100% | NaOH | 2.0% | 43.0% | 2.0% | 5.0 | | | | | 2 | Polyvalent metal salt |
| Example 4 | | 100% | NaOH | 0.8% | 29.0% | 0.8% | 2.0 | | | | | 1 | Acid |
| Example 5 | | 100% | NaOH | 2.0% | 80.0% | 2.0% | 5.0 | | | | | 1 | Acid |
| Example 6 | | 100% | NaOH | 2.0% | 43.0% | 2.0% | 5.0 | | | | | 1 | Acid |
| Example 7 | | 100% | NaOH | 2.0% | 43.0% | 2.0% | 5.0 | | | | | 1 | Acid |
| Example 8 | | 100% | NaOH | 2.0% | 18.0% | 2.0% | 5.0 | | | | | 1 | Acid |
| Example 9 | | 35% | NaOH | 2.0% | 43.0% | 2.0% | 5.0 | | | | | 1 | Acid |
| Example 10 | | 100% | NH3 | 2.0% | 18.0% | 2.0% | 5.0 | | | | | 1 | Acid |
| Example 11 | | 100% | MEA | 2.0% | 18.0% | 2.0% | 5.0 | | | | | 1 | Acid |
| Example 12 | | 100% | NaOH | 2.0% | 43.0% | 2.0% | 5.0 | | | | | 1 | Acid |
| Example 13 | | 100% | NaOH | 2.0% | 43.0% | 2.0% | 5.0 | | | | | 1 | Acid |
| Example 14 | | 100% | NaOH | 2.0% | 43.0% | 2.0% | 5.0 | | | | | 1 | Acid |

TABLE 2

| | Pigment dispersion polymer A | | | | Water-soluble polymer B | | | | | | | | |
|---|---|---|---|---|---|---|---|---|---|---|---|---|---|
| | Monomer type | Mw | ClogP | Liberated amount [% by mass] | | Monomer type (Numerical value in parenthesis is mass ratio) | | | | Acid value [mgKOH/g] | Property | Mw | ClogP | Tg [° C.] |
| Example 15 | A-1: BzMA/ MMA/ MAA | 42k | 1.89 | 0.40% | B-15 | MAA (9) | HEMA (20) | — | MMA (71) | 60 | Water soluble | 15k | 0.53 | 109 |
| Example 16 | | | | 0.40% | B-16 | | | CyHMA (4) | MMA | 60 | Water soluble | 15k | 0.61 | 108 |
| Example 17 | | | | 0.40% | B-17 | | | DCPMA (4) | | 60 | Water soluble | 15k | 0.48 | 112 |
| Example 18 | | | | 0.40% | B-18 | | | St (4) | | 60 | Water soluble | 15k | 0.60 | 109 |
| Example 19 | | | | 0.40% | B-19 | | | IBOMA (4) | | 60 | Water soluble | 15k | 0.68 | 112 |
| Example 20 | | | | 0.40% | B-20 | | | nBA(78) | — | 60 | Water soluble | 15k | 1.43 | −21 |
| Example 21 | | | | 0.40% | B-21 | MAA (5) | HEMA (25) | BzA (45) | MMA (25) | 60 | Water soluble | 15k | 1.34 | 52 |
| Example 22 | | | | 0.40% | B-1 | MAA (9) | HEMA (20) | IBOMA (30) | MAA (41) | 60 | Water soluble | 15k | 1.69 | 127 |
| Example 23 | A-3: C18MA/ St/AA | 50k | 2.99 | 0.20% | B-1 | | | | | 60 | Water soluble | 15k | 1.69 | 127 |
| Example 24 | A-2: BzMA/ MMA (cross linked) | 30k | 1.79 | 0.01% | B-1 | | | | | 60 | Water soluble | 15k | 1.69 | 127 |

TABLE 2-continued

| | | | | | | | | | | | |
|---|---|---|---|---|---|---|---|---|---|---|---|
| Example 25 | A-1: BzMA/ | 42k | 1.89 | 0.40% | B-1 | | | 60 | Water soluble | 15k | 1.69 | 127 |
| Example 26 | MMA MAA/ | | | 0.40% | B-1 | | | 60 | Water soluble | 15k | 1.69 | 127 |
| Example 27 | | | | 0.40% | B-22 | St (30) | | 60 | Water soluble | 15k | 1.06 | 108 |
| Example 28 | | | | 0.40% | B-1 | IBOMA (30) | | 60 | Water soluble | 15k | 1.69 | 127 |
| Example 29 | A-1: BzMA/ | 42k | 1.89 | 0.40% | B-23 | | | 60 | Water soluble | 15k | 1.69 | 127 |
| Example 30 | MMA MAA/ | | | 0.40% | B-24 | | | 60 | Water soluble | 15k | 1.69 | 127 |
| Example 31 | | | | 0.40% | B-25 | MeSt (30) | | 60 | Water soluble | 15k | 1.69 | 127 |
| Example 32 | | | | 0.40% | B-26 | IBOMA (20) MeSt (10) | | 60 | Water soluble | 15k | 1.69 | 127 |
| Example 33 | | | | 0.40% | B-1 | IBOMA (30) | | 60 | Water soluble | 15k | 1.69 | 127 |

| | Water-soluble polymer B | | | | | | Solvent [content] | | | | Treatment liquid | |
|---|---|---|---|---|---|---|---|---|---|---|---|---|
| | Neutral-ization degree [% by mol] | Base for neutral-ization | Content [% by mass] | Total amount of acid group and Formula (1) [% by mass] | Liberated amount [% by mass] | Ratio $D^B/D^A$ of liberated polymer | First solvent [% by mass] | Second solvent [% by mass] | Total amount [% by mass] | Content mass ratio | Type | Aggregation component |
| Example 15 | 100% | NaOH | 2.0% | 29.0% | 2.0% | 5.0 | PG 27% | Glycerin 2.5% | 29.5% | 0.1 | 1 | Acid |
| Example 16 | 100% | NaOH | 2.0% | 29.0% | 2.0% | 5.0 | | | | | 1 | Acid |
| Example 17 | 100% | NaOH | 2.0% | 29.0% | 2.0% | 5.0 | | | | | 1 | Acid |
| Example 18 | 100% | NaOH | 2.0% | 29.0% | 2.0% | 5.0 | | | | | 1 | Acid |
| Example 19 | 100% | NaOH | 2.0% | 29.0% | 2.0% | 5.0 | | | | | 1 | Acid |
| Example 20 | 100% | NaOH | 2.0% | 29.0% | 2.0% | 5.0 | | | | | 1 | Acid |
| Example 21 | 100% | NaOH | 2.0% | 30.0% | 2.0% | 5.0 | | | | | 1 | Acid |
| Example 22 | 100% | NaOH | 2.0% | 29.0% | 2.0% | 5.0 | PG 19.5% | Glycerin 10% | | 0.5 | 1 | Acid |
| Example 23 | 100% | NaOH | 2.0% | 29.0% | 2.0% | 10.0 | | | | | 1 | Acid |
| Example 24 | 100% | NaOH | 2.0% | 29.0% | 2.0% | 200.0 | | | | | 1 | Acid |
| Example 25 | 100% | NaOH | 2.0% | 29.0% | 2.0% | 5.0 | PG 35% | Glycerin 5% | 40% | 0.1 | 1 | Acid |
| Example 26 | 100% | NaOH | 2.0% | 29.0% | 2.0% | 5.0 | 2-py 20% | Glycerin 10% | 30% | 0.5 | 1 | Acid |
| Example 27 | 100% | NaOH | 2.0% | 29.0% | 2.0% | 5.0 | PG 27% | Glycerin 2.5% | 29.5% | 0.1 | 1 | Acid |
| Example 28 | 100% | NaOH | 2.0% | 29.0% | 2.0% | 5.0 | | | | | 1 | Acid |
| Example 29 | 65% | NaOH | 2.0% | 29.0% | 2.0% | 5.0 | PG 27% | Glycerin 2.5% | 29.5% | 0.1 | 1 | Acid |
| Example 30 | 85% | NaOH | 2.0% | 29.0% | 2.0% | 5.0 | | | | | 1 | Acid |
| Example 31 | 100% | NaOH | 2.0% | 29.0% | 2.0% | 5.0 | | | | | 1 | Acid |
| Example 32 | 100% | NaOH | 2.0% | 29.0% | 2.0% | 5.0 | | | | | 1 | Acid |
| Example 33 | 100% | NaOH | 2.0% | 29.0% | 2.0% | 5.0 | PG 25% | — | 25% | 0 | 1 | Acid |

TABLE 3

| | Pigment dispersion polymer A | | | | Water-soluble polymer B or comparative polymer | | | | |
|---|---|---|---|---|---|---|---|---|---|
| | Monomer type | Mw | ClogP | Liberated amount [% by mass] | | Monomer type (Numerical value in parenthesis is mass ratio) | | | Acid value [mgKOH/g] |
| Comparative Example 1 | A-1: BzMA/ MMA MAA/ | 42k | 1.89 | 0.40% | CB-1 | MAA (5) | — | DCPMA (10) | MMA (85) | 32.6 |
| Comparative Example 2 | | | | 0.40% | CB-2 | MAA (9) | HEMA (20) | IBOMA (30) | MMA (41) | 60 |
| Comparative Example 3 | | | | 0.40% | CB-3 | | | | | 60 |
| Comparative Example 4 | | | | 0.40% | CB-4 | | | St (10) | MMA (81) | 60 |

| | | Water-soluble polymer B or comparative polymer | | | | | | | |
|---|---|---|---|---|---|---|---|---|---|
| | Property | Mw | ClogP | Tg [° C.] | Neutralization degree [% by mol] | Base for neutralization | Content [% by mass] | Total amount of acid group and Formula (1) | Liberated amount [% by mass] |
| Comparative Example 1 | Water insoluble | 50K | 0.77 | 116 | 90% | NaOH | 2.0% | 5.0% | 0% |
| Comparative Example 2 | Water soluble | 15K | 1.69 | 127 | 100% | NaOH | 0.5% | 29.0% | 0.5% |
| Comparative Example 3 | Water soluble | 15K | 1.69 | 127 | 100% | NaOH | 2.0% | 29.0% | 2.0% |
| Comparative Example 4 | Water soluble | 15K | 0.86 | 113 | 100% | NaOH | 2.0% | 9.0% | 2.0% |

| | Ratio $D^B/D^A$ of liberated polymer | Solvent [content] | | | Treatment liquid | | |
|---|---|---|---|---|---|---|---|
| | | First solvent [% by mass] | Second solvent [% by mass] | Total amount [% by mass] | Content mass ratio | Type | Aggregation component |
| Comparative Example 1 | 0.0 | PG 27% | Glycerin 2.5% | 29.5% | 0.1 | 1 | Acid |
| Comparative Example 2 | 1.3 | | | | | 1 | Acid |
| Comparative Example 3 | 5.0 | | | | | — | |
| Comparative Example 4 | 5.0 | | | | | 1 | Acid |

The details of the monomers in Tables 1 to 3 are as follows.

BzMA: Benzyl methacrylate (FUJIFILM Wako Pure Chemical Corporation)
C18MA: Stearyl Methacrylate (FUJIFILM Wako Pure Chemical Corporation)
St: Styrene (FUJIFILM Wako Pure Chemical Corporation)
AA: Acrylic acid (FUJIFILM Wako Pure Chemical Corporation)
MAA: Methacrylic acid (FUJIFILM Wako Pure Chemical Corporation)
MMA: Methyl methacrylate (FUJIFILM Wako Pure Chemical Corporation)
IBOMA: Isobornyl methacrylate (FUJIFILM Wako Pure Chemical Corporation)
HEMA: 2-Hydroxyethyl methacrylate (FUJIFILM Wako Pure Chemical Corporation)
AMPS: Monomer with the following structure (Tokyo Chemical Industry Co., Ltd.)
P-1M: Monomer with the following structure (Kyoeisha Chemical Co., Ltd.)
DMAAm: Dimethylacrylamide (FUJIFILM Wako Pure Chemical Corporation)
PME1000: Methoxypolyethylene glycol methacrylate (trade name: Blemmer (registered trademark) PME-1000 (—($C_2H_4O$)$_n$-containing), NOF CORPORATION; a monomer forming the constitutional unit represented by General Formula (1))
EOEOEA: 2-(2-Ethoxyethoxy)ethyl acrylate (Tokyo Chemical Industry Co., Ltd., —($C_2H_4O$)$_2$-containing; a monomer forming the constitutional unit represented by General Formula (1))
CyHMA: Cyclohexylmethacrylate (Tokyo Chemical Industry Co., Ltd.; a monomer forming the constitutional unit represented by General Formula (B))
DCPMA: Dicyclopentanyl methacrylate (Tokyo Chemical Industry Co., Ltd.; a monomer forming the constitutional unit represented by General Formula (B))
NBA: n-butyl acrylate (FUJIFILM Wako Pure Chemical Corporation)
MEA: Monoethanolamine
2-py: 2-pyrrolidone

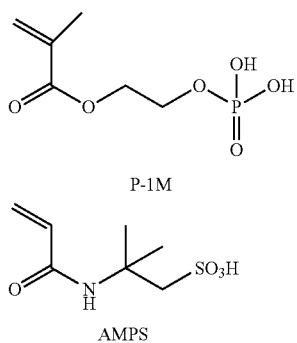

TABLE 4

| | Evaluation | | | | |
|---|---|---|---|---|---|
| | Film quality | Blurring | Image cracking | Head maintainability | Jettability |
| Example 1 | A | C | B | A | C |
| Example 2 | A | C | B | A | C |
| Example 3 | A | C | C | A | C |
| Example 4 | A | C | B | A | A |
| Example 5 | A | B | B | C | C |
| Example 6 | A | B | C | A | C |
| Example 7 | A | B | C | A | B |
| Example 8 | A | A | B | A | A |
| Example 9 | A | B | C | C | A |
| Example 10 | A | A | B | C | A |
| Example 11 | A | A | B | C | A |
| Example 12 | A | B | C | A | A |
| Example 13 | A | B | B | A | A |
| Example 14 | A | B | B | A | A |
| Example 15 | A | A | A | C | A |
| Example 16 | A | A | B | B | A |
| Example 17 | A | A | A | B | A |
| Example 18 | A | A | A | B | A |
| Example 19 | A | A | A | B | A |
| Example 20 | B | A | C | B | A |
| Example 21 | B | A | C | A | A |
| Example 22 | C | A | A | A | A |
| Example 23 | C | A | A | A | A |
| Example 24 | C | A | A | A | A |
| Example 25 | C | A | A | A | A |
| Example 26 | C | A | A | C | A |
| Example 27 | A | A | A | A | A |
| Example 28 | A | A | A | A | A |
| Example 29 | A | A | A | A | A |
| Example 30 | A | A | A | A | A |
| Example 31 | A | A | A | A | A |
| Example 32 | A | A | A | A | A |
| Example 33 | A | A | A | A | A |
| Comparative Example 1 | D | D | D | A | A |
| Comparative Example 2 | D | D | D | A | A |
| Comparative Example 3 | D | D | A | D | A |
| Comparative Example 4 | A | A | D | A | A |

As shown in Table 4, in Examples, the occurrence of bleeding in the image was suppressed, and the occurrence of cracks on the white background in the image was also suppressed to a small extent. Among these, in Examples 27 to 33, particularly satisfactory results were obtained.

Examples 1 and 2 in which the water-soluble polymer B containing a sulfonic acid group or a phosphoric acid group as an acid group was used were inferior to that of Examples in which the acid group was a carboxylic acid group in that the bleeding occurred.

In Example 3 in which the treatment liquid containing a polyvalent metal salt was used as the treatment liquid, the thickening action of the ink composition during the image recording was weaker than, for example, that of Example 8 in which the acid treatment liquid was used, and the occurrence of bleeding was not suppressed.

In Example 4 in which the content of the water-soluble polymer B is low (in other words, the liberation polymer ratio $D^B/D^A$ is small), a decrease in bleeding is observed. Therefore, the content of the water-soluble polymer B is preferably in the range of 1% by mass more with respect to a total mass of the ink composition.

In Example 5, since there are a large number of constitutional units derived from the hydrophilic monomer in the water-soluble polymer B, the maintainability of the jetting head is lowered, and the jettability of the ink composition is also lowered.

In Example 6, since the Mw of the water-soluble polymer B was as large as 100,000, the jettability of the ink composition was inferior to that of Example 8 of, for example, Mw 15,000. In Example 7 in which the Mw of the water-soluble polymer B was 50,000, the jettability was improved as compared with Example 6, but it was still inferior to that of Example 8. In Examples 6 and 7, since the acid value of the water-soluble polymer B is high, the cracking of the image slightly occurred.

In Example 9, since the neutralization degree of the water-soluble polymer B is less than 40%, the dispersion stability of the pigment is lowered, and as a result of the pigment fixing to the inside of the head, the maintainability of the jetting head is inferior to that of the other Examples.

Examples 10 to 11 in which the base used for neutralization was an organic amine were inferior to the other Examples in which an inorganic base was used in that maintainability of the jetting head.

In Example 15 in which the hydrophobic monomer unit constituting the water-soluble polymer B was not contained, the maintainability of the jetting head was lowered.

On the other hand, in Examples 16 to 19 in which the hydrophobic monomer unit constituting the water-soluble polymer B was contained, relatively satisfactory results were obtained with respect to the maintainability of the jetting head.

In Examples 20 and 21, since the Tg of the water-soluble polymer B was as low as less than 80° C., the landed and dropwise addition ink is more likely to move as compared with the other Examples, and as a result, the degree of the occurrence of cracking of the image after drying increased. Therefore, the Tg of the water-soluble polymer B is preferably 80° C. or higher.

In Examples 22 to 24, since the ratio of the content of the second solvent to the content of the first solvent of the water-soluble organic solvent contained in the ink composition was more than 0.3, and the ratio of the high boiling point solvent was relatively high, it was difficult to carry out drying as compared with the other Examples in which the ratio was 0.3 or less, and the images with a sticky film quality were obtained.

In Example 25 in which the total amount of the water-soluble organic solvent contained in the ink composition was more than 30% by mass, the film quality was lower than that in the other Examples. The total amount of the water-soluble organic solvent contained in the ink composition is preferably in the range of 30% by mass or less.

In Example 26 in which 2-pyrrolidone that is an amino compound was used as the water-soluble organic solvent, a lower film quality than the other Examples in which PG that is an alcohol-based organic solvent was used was obtained. The water-soluble organic solvent contained in the ink composition is preferably an alcohol-based organic solvent.

In contrast to the above results, in Comparative Examples 1 to 3, bleeding occurred in the image, and only image having uneven density was obtained. In Comparative Example 4, although no bleeding occurred, cracks on the white background were remarkably observed in the image.

What is claimed is:

1. An ink set comprising:
   an ink composition that contains water, a pigment, a pigment dispersion polymer A, and a water-soluble polymer B different from the pigment dispersion polymer A; and
   a treatment liquid that contains water and at least one selected from the group consisting of a polyvalent metal salt, an acidic compound, and a cationic polymer,
   wherein the pigment dispersion polymer A contains at least one acid group selected from the group consisting of a phosphoric acid group, a sulfonic acid group, and a carboxylic acid group, and an aromatic ring,
   the water-soluble polymer B contains at least one acid group selected from the group consisting of a phosphoric acid group, a sulfonic acid group, and a carboxylic acid group, and a constitutional unit represented by General Formula (1),
   in the ink composition, a ratio of a content concentration of the water-soluble polymer B to a content concentration of the pigment dispersion polymer A in a liberated polymer is 1.6 or more in terms of a mass,

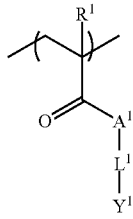

General Formula (1)

in the Formula, $R^1$ represents a hydrogen atom or an alkyl group having 1 to 4 carbon atoms,
$A^1$ represents —O—,
$L^1$ represents a divalent linking group that is one kind selected from the group A consisting of an alkylene group, an alkenylene group, an alkynylene group, an arylene group, —O—, and —C(=O)—, or a divalent linking group that is obtained by combining two or more kinds selected from the group A,
$Y^1$ represents —OH, —$R^2$, —$OR^2$, —$NH_2$, —$NHR^2$, —$NR^2R^3$, or —SH,
$R^2$ and $R^3$ each independently represent an alkyl group having 1 to 3 carbon atoms, an alkenyl group having 2 or 3 carbon atoms, or an alkynyl group having 2 or 3 carbon atoms.

2. The ink set according to claim 1,
   wherein the pigment dispersion polymer A is a polymer having a C log P of 1.75 or more, and the water-soluble polymer B is a polymer having a C log P of 1.74 or less.

3. The ink set according to claim 1,
   wherein a content of the water-soluble polymer B in the ink composition is 1% by mass to 5% by mass with respect to a total mass of the ink composition.

4. The ink set according to claim 1,
   wherein a total amount of the acid group and the constitutional unit represented by General Formula (1) in the water-soluble polymer B is 5% by mass to 45% by mass with respect to a solid content mass of the water-soluble polymer B.

5. The ink set according to claim 1,
   wherein a weight-average molecular weight of the water-soluble polymer B is 5,000 to 100,000.

6. The ink set according to claim 1,
   wherein an acid value of the water-soluble polymer B is 28 mgKOH/g to 230 mgKOH/g.

7. The ink set according to claim 1,
   wherein the water-soluble polymer B contains a carboxylic acid group as the acid group, and
   40% by mol or more of the carboxylic acid group is neutralized with a base.

8. The ink set according to claim 7,
   wherein the base is a hydroxide of an alkali metal or an organic amine having a boiling point of 80° C. or higher.

9. The ink set according to claim 1,
   wherein a content ratio of the constitutional unit represented by General Formula (1) in the water-soluble polymer B is 3% by mass to 45% by mass with respect to all constitutional units of the water-soluble polymer B.

10. The ink set according to claim 1,
    wherein the water-soluble polymer B further contains at least one constitutional unit selected from the group consisting of the constitutional unit represented by General Formula (A) and the constitutional unit represented by General Formula (B),

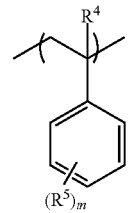

(A)

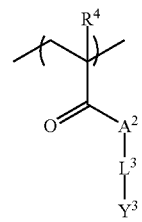

(B)

in the Formulae, $R^4$'s each independently represent a hydrogen atom or a methyl group,
$R^5$'s each independently represent an alkyl group, an alkenyl group, or an alkynyl group,
m is an integer of 0 to 5,
$A^2$ represents a single bond or —O—,
$L^3$ represents a divalent linking group that is one kind selected from the group B consisting of an alkylene group, an alkenylene group, an alkynylene group, —O—, and —C(=O)—, a divalent linking group that is obtained by combining two or more kinds selected from the group B, or a single bond, and $Y^3$ represents an alkyl group having 4 to 22 carbon atoms, an alkenyl group having 4 to 22 carbon atoms, an alkynyl group having 4 to 22 carbon atoms, a cycloalkyl group having 4 to 22 carbon atoms, or an aryl group having 6 to 22 carbon atoms.

11. The ink set according to claim 10,
wherein the water-soluble polymer B contains, as the constitutional unit represented by General Formula (A) or General Formula (B), at least one constitutional unit selected from the group consisting of a constitutional unit represented by General Formula (a) and a constitutional unit represented by any one of General Formulae (b-1), (b-2), (b-3), or (b-4),

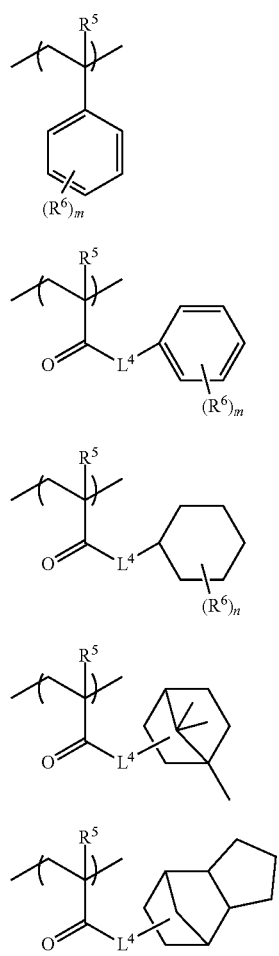

in the Formulae, $R^5$'s each independently represent a hydrogen atom or a methyl group, $R^6$'s each independently represent an alkyl group, m represents an integer of 0 to 5, and n represents an integer of 0 to 11, and $L^4$'s each independently represent a divalent linking group that is one kind selected from the group C consisting of an alkylene group having 1 to 18 carbon atoms, —O—, and —C(=O)—, a divalent linking group that is obtained by combining two or more kinds selected from the group C, or a single bond.

12. The ink set according to claim 11,
wherein a total content ratio of the constitutional unit represented by General Formula (a) and the constitutional unit represented by any one of General Formulae (b-1), (b-2), (b-3), or (b-4) in the water-soluble polymer B is 5% by mass to 50% by mass with respect to all constitutional units of the water-soluble polymer B.

13. The ink set according to claim 1,
wherein the water-soluble polymer B has a glass transition temperature of 80° C. or higher.

14. The ink set according to claim 1,
wherein the ink composition further contains a water-soluble organic solvent,
the water-soluble organic solvent contains a first organic solvent having a boiling point of 110° C. to 240° C., and a second organic solvent having a boiling point of 245° C. to 300° C., and
a mass ratio of a content of the second organic solvent to a content of the first organic solvent is 0 to 0.3.

15. The ink set according to claim 14,
wherein a total amount of the first organic solvent and the second organic solvent is 5% by mass to 30% by mass with respect to a total mass of the ink composition.

16. The ink set according to claim 14,
wherein each of the first organic solvent and the second organic solvent is at least one alcohol-based organic solvent selected from the group consisting of ethylene glycol, diethylene glycol, propylene glycol, triethylene glycol, dipropylene glycol, glycerin, and an alkyl ether thereof.

17. The ink set according to claim 1,
wherein the acidic compound contains a monovalent, divalent, or trivalent acid.

18. The ink set according to claim 1,
wherein the ink set is used in an ink jet recording method.

19. An image recording method comprising:
a step of applying a treatment agent of the ink set according to claim 1 onto a recording medium; and
a step of applying the ink composition of the ink set according to claim 1 onto a treatment liquid-applied surface of the recording medium to which the treatment agent has been applied to recording an image.

* * * * *